United States Patent
Tani

(10) Patent No.: US 12,458,440 B2
(45) Date of Patent: Nov. 4, 2025

(54) ELECTRICITY SUPPLIER

(71) Applicant: NATIONAL UNIVERSITY CORPORATION SHIGA UNIVERSITY OF MEDICAL SCIENCE, Otsu (JP)

(72) Inventor: Tohru Tani, Otsu (JP)

(73) Assignee: NATIONAL UNIVERSITY CORPORATION SHIGA UNIVERSITY OF MEDICAL SCIENCE, Otsu (JP)

( * ) Notice: Subject to any disclaimer, the term of this patent is extended or adjusted under 35 U.S.C. 154(b) by 775 days.

(21) Appl. No.: 17/775,831

(22) PCT Filed: Nov. 9, 2020

(86) PCT No.: PCT/JP2020/041667
§ 371 (c)(1),
(2) Date: May 10, 2022

(87) PCT Pub. No.: WO2021/095671
PCT Pub. Date: May 20, 2021

(65) Prior Publication Data
US 2022/0378504 A1     Dec. 1, 2022

(30) Foreign Application Priority Data
Nov. 12, 2019   (JP) .................... 2019-204440

(51) Int. Cl.
*A61B 18/18* (2006.01)
*A61B 17/34* (2006.01)
*A61B 18/00* (2006.01)

(52) U.S. Cl.
CPC ...... *A61B 18/1815* (2013.01); *A61B 17/3476* (2013.01); *A61B 2018/00178* (2013.01);
(Continued)

(58) Field of Classification Search
CPC ...... A61B 17/3476; A61B 2018/00178; A61B 2018/0091
See application file for complete search history.

(56) References Cited

U.S. PATENT DOCUMENTS 5,925,041 A * 7/1999 Long .................. A61B 17/34
606/41
6,106,519 A * 8/2000 Long .................. A61B 18/1487
606/41
(Continued)

FOREIGN PATENT DOCUMENTS

JP      H1156865 A      3/1999
JP      2015123117 A    7/2015
(Continued)

OTHER PUBLICATIONS

Extended European Search Report dated Nov. 2, 2023 for corresponding EP Patent Application No. 20888185.4, 7 pages.
(Continued)

Primary Examiner — Jaymi E Della
(74) Attorney, Agent, or Firm — MH2 Technology Law Group, LLP

(57) ABSTRACT

A power supply device in which a device shaft provided with a power receiver is inserted in a through-hole of a port site, which is capable of supplying electric power to the power receiver at a low cost and enabling fine operation of the device shaft. The power supply includes a port site; first terminals provided on an inner surface of the through-hole; wires that connect the first terminals and a power source; a device shaft that is insertable into the through-hole; a power receiver provided on the device shaft; second terminals provided on an outer surface of the device shaft; and wires that connect the power receiver and the second terminals. Electric power from the power supply can be supplied to the power receiver by inserting the device shaft into the
(Continued)

through-hole to thereby bring the first terminals and the second terminals into contact with each other.

15 Claims, 17 Drawing Sheets

(52) U.S. Cl.
CPC ............... *A61B 2018/0091* (2013.01); *A61B 2018/1823* (2013.01); *H01R 2201/12* (2013.01)

(56) References Cited

U.S. PATENT DOCUMENTS

| | | | |
|---|---|---|---|
| 2003/0055417 A1* | 3/2003 | Truckai | ............ A61B 18/1815 |
| | | | 606/27 |
| 2004/0049254 A1 | 3/2004 | Richerche | |
| 2016/0151113 A1 | 6/2016 | Kim et al. | |
| 2017/0332881 A1 | 11/2017 | Matsuki et al. | |
| 2018/0271557 A1* | 9/2018 | Buyda | ................ A61B 17/3423 |

FOREIGN PATENT DOCUMENTS

| | | |
|---|---|---|
| WO | 2006084676 A1 | 8/2006 |
| WO | 2016135945 A1 | 9/2016 |

OTHER PUBLICATIONS

International Search Report dated Jan. 19, 2021 for International Application No. PCT/JP2020/041667, 4 pages including English translation.

* cited by examiner

ELECTRICITY SUPPLIER

CROSS-REFERENCE TO RELATED APPLICATIONS

This application is a U.S. National Stage application of Int'l Application No. PCT/JP2020/041667 filed 9 Nov. 2020, which claims priority to Japanese Application No. 2019-204440 filed 12 Nov. 2019, the entire disclosures of which are incorporated herein by reference in their entireties.

TECHNICAL FIELD

The present invention relates to a power supply device that is capable of supplying electric power to a power receiver of a device shaft when a device shaft having microwave forceps or like surgical device mounted thereon is inserted into a through-hole of a port site.

BACKGROUND ART

In recent years, the majority of surgeries has shifted to robot-assisted surgery and endoscopic surgery. In these surgeries, surgical instruments comprising a device shaft for performing surgery inside the subject's body are used. Surgical instruments of this type include a device that comprises: a port site, which is installed by piercing the subject's body wall; and a device shaft, which is inserted into the body through a through-hole of the port site, and that emits microwaves from the device shaft to coagulate a bleeding area.

In such a device, a thick, rigid coaxial cable is connected to the device shaft in order to directly supply microwaves to the device shaft. Therefore, when a plurality of such devices is used in surgery, multiple coaxial cables are intricately present in the space on an operating table, which is extremely obtrusive. If multiple coaxial cables are connected to each other to avoid this problem, movement of the device shaft is restricted, which makes fine operation of the device shaft difficult.

In particular, when using 2.45 GHz microwaves, which are useful for surgery, the treated area must be irradiated with about 50 W of microwaves. Accordingly, a coaxial cable of 2 m or longer is usually routed from an external microwave power source to supply 50 W of electric power to the tip of the device. In this case, since the transmission loss of microwaves is large, the wiring is performed by using a coaxial cable having a diameter of about 10 mm. The coaxial cable for microwaves is slightly flexible, but quite rigid. Therefore, it is not easy to operate the device shaft while dragging the coaxial cable, and there is also a concern regarding patient safety.

In recent years, radio-frequency devices with a built-in battery have also been proposed as devices that do not necessitate such coaxial cables. However, it is indicated that the battery life, weight, and size of such devices are not yet at the level that can satisfy the requirements.

In recent years, surgical instruments that connect coaxial cables to a port site, instead of a device shaft, have also been proposed. For example, Patent Literature (PTL) 1 discloses a surgical device wherein radio-frequency electric power is supplied from a power source device to a port site (trocar) via a coaxial cable, and the electric power supplied to the port site (trocar) is wirelessly supplied to the device shaft. However, in order to achieve the wireless power supply, the device disclosed in PTL 1 essentially comprises a power transmission coil in the port site (trocar) and a power receiving coil in the device shaft; furthermore, in order to maintain the state in which the power transmission coil and the power receiving coil face each other, a complicated mechanism of sliding the device shaft is also required. Therefore, the surgical device disclosed in PTL 1 has a high production cost and is considered to be difficult to make disposable.

CITATION LIST

Patent Literature

PTL 1: JP2015-123117A

SUMMARY OF INVENTION

Technical Problem

The present invention has been made in view of the above. An object of the present invention is to provide a power supply device wherein a device shaft provided with a power receiver is inserted into a through-hole of a port site, the power supply device being capable of supplying electric power to the power receiver at a low cost and enabling fine operation of the device shaft.

Solution to Problem

In order to achieve the above object, the present invention includes the subject matter described in the following items.

Item 1. A power supply device comprising:
  a port site formed of an insulating material and comprising a through-hole;
  a port site-side terminal provided on an inner surface of the through-hole of the port site;
  a port site-side power supply line connecting the port site-side terminal to a power source;
  a device shaft that is insertable into the through-hole;
  a power receiver provided on the device shaft;
  a shaft-side terminal provided on an outer surface of the device shaft; and
  a shaft-side power supply line provided on the device shaft to connect the power receiver and the shaft-side terminal,
  wherein insertion of the device shaft into the through-hole of the port site enables the port site-side terminal and the shaft-side terminal to be in contact with each other; and in the state in which the port site-side terminal and the shaft-side terminal are in contact with each other, electric power from the power source is allowed to be supplied to the power receiver through the port site-side power supply line, the port site-side terminal, the shaft-side terminal, and the shaft-side power supply line.

Item 2. The power supply device according to Item 1, further comprising a gas supply tube connected to the port site, wherein gas that flows in the gas supply tube is introduced into the through-hole and is discharged from an opening of the through-hole at the other end of the port site.

Item 3. The power supply device according to Item 1 or 2, comprising a cylindrical cover formed of a stretchable insulating material, wherein
  the cylindrical cover is provided so as to allow the device shaft to pass inside the cover, and one end of the cylindrical cover is fixed to the outer surface of the device shaft at a midway position of the device shaft;

the shaft-side terminal is provided on the tip side of the device shaft with respect to the midway position; and in the state in which the port site-side terminal and the shaft-side terminal are in contact with each other, the other end of the cylindrical cover is in contact with one end of the port site and the entirety of the shaft-side terminal in contact with the port site-side terminal is housed in a space composed of the inside of the cylindrical cover and the through-hole of the port site.

Item 4. The power supply device according to any one of Items 1 to 3, wherein in the state in which the port site-side terminal and the shaft-side terminal are in contact with each other, the entirety of the shaft-side terminal in contact with the port site-side terminal is positioned inside the through-hole.

Item 5. The power supply device according to any one of Items 1 to 4, wherein the port site-side terminal comprises a pair of port site-side terminals that are disposed diametrically opposite to each other in a radial direction of the port site;

the port site-side power supply line comprises a first port site-side power supply line for connecting one of the port site-side terminals and a power source, and a second port site-side power supply line for connecting the other of the port site-side terminals and the power source;

the shaft-side terminal comprises a pair of shaft-side terminals that are disposed diametrically opposite to each other in a radial direction of the device shaft;

the shaft-side power supply line comprises a first shaft-side power supply line for connecting one of the shaft-side terminals and the power receiver, and a second shaft-side power supply line for connecting the other of the shaft-side terminals and the power receiver; and the pair of shaft-side terminals are placed into the through-hole of the port site to bring one of the pair of shaft-side terminals into contact with one of the pair of port site-side terminals and bring the other of the pair of shaft-side terminals into contact with the other of the pair of port site-side terminals, whereby electric power from the power source is allowed to be supplied to the power receiver by means of the first and second port site-side power supply lines, the pair of port site-side terminals, the pair of shaft-side terminals, and the first and second shaft-side power supply lines.

Item 6. The power supply device according to Item 5, wherein in the circumferential direction of the port site, a gap is provided between one-side ends of the pair of port site-side terminals, which are on one side, and between the opposite-side ends of the pair of port site-side terminals, which are on the other side, and the width of each of the pair of shaft-side terminals is shorter than the width of the gap.

Item 7. The power supply device according to Item 5 or 6, wherein multiple sets of the pair of shaft-side terminals are provided so as to be spaced apart from each other in the axial direction of the device shaft;

the shaft-side power supply line comprises a first shaft-side power supply line for connecting one of the pair of shaft-side terminals of each set to the power source, and a second shaft-side power supply line for connecting the other of the pair of shaft-side terminals of each set to the power source, one set of the pair of shaft-side terminals are placed into the through-hole of the port site to bring one of the shaft-side terminals of the one set into contact with one of the pair of port site-side terminals and bring the other of the shaft-side terminals of the one set into contact with the other of the pair of port site-side terminals, whereby electric power from the power source is allowed to be supplied to the power receiver by means of the first and second port site-side power supply lines, the pair of port site-side terminals, the pair of shaft-side terminals, and the first and second shaft-side power supply lines.

Item 8. The power supply device according to Item 7, wherein in the state in which one of the shaft-side terminals of the one set is in contact with one of the pair of port site-side terminals and the other of the shaft-side terminals of the one set is in contact with the other of the pair of port site-side terminals, the entirety of the shaft-side terminals of the one set is housed in the through-hole of the port site.

Item 9. The power supply device according to Item 7 or 8, wherein the distance between two sets of the pair of shaft-side terminals adjacent to each other in the axial direction of the device shaft is equal to the length of the pair of port site-side terminals.

Item 10. The power supply device according to any one of Items 7 to 9, wherein the pair of shaft-side terminals of each set are individually supported by a spring and disposed in recesses formed on the outer surface of the device shaft;

the first shaft-side power supply line passes through one of the recesses in which one of the pair of shaft-side terminals of each set is disposed, and the second shaft-side power supply line passes through the other of the recesses in which the other of the pair of shaft-side terminals of each set is disposed;

in the state in which one of the pair of shaft-side terminals of one set is pushed down so as to come into contact with the first shaft-side power supply line that passes through the one of the recesses and the other of the pair of shaft-side terminals of each set is pushed down so as to come into contact with the second shaft-side power supply line that passes through the other of the recesses, the shaft-side terminals of the one set are placed into the through-hole of the port site to bring one of the shaft-side terminals of the one set into contact with one of the pair of port site-side terminals and bring the other of the shaft-side terminals of the one set into contact with the other of the pair of port site-side terminals, whereby electric power from the power source is allowed to be supplied to the power receiver by means of the first and second port site-side power supply lines, the pair of port site-side terminals, the pair of shaft-side terminals of the one set, and first and second shaft-side power supply lines.

Item 11. The power supply device according to Item 10, wherein the first shaft-side power supply line comprises a plurality of first wire rods that are serially disposed in the axial direction of the device shaft;

the second shaft-side power supply line comprises a plurality of second wire rods that are serially disposed in the axial direction of the device shaft;

among the plurality of first wire rods, the first wire rod that is the closest to the power receiver is configured such that one end of the first wire rod on the side proximal to the power receiver is connected to the power receiver, and the other end of the first wire rod on the side distal to the power receiver extends out into the recess that is the closest to the power receiver among the recesses in which one of the pair of shaft-side terminals of each set is disposed, whereas the first wire rods other than the first wire rod that is the closest to the power receiver are configured such that one end of the first wire rods on the side proximal to the power receiver and the other end of the first wire rods on the side distal to the power receiver respectively extend out into the recesses that are adjacent to each other in the axial direction of the device shaft and in which one of the pair of shaft-side terminals of each set is disposed and;

the plurality of first wire rods are configured such that the other ends of the first wire rods are individually supported by a spring and disposed in the recesses; by pushing the shaft-side terminal into the recesses, the shaft-side terminal can be brought into contact with the other ends of the first wire rods disposed in the recess;

when the shaft-side terminal is not pushed into the recesses into which one end of the first wire rod on the side distal to the power receiver and the other end of the first wire rods on the side proximal to the power receiver extend out, the other end of the first wire rods on the side proximal to the power receiver is lifted up by an elastic force of the spring, whereby the other end of the first wire rods comes into contact with one end of the first wire rods on the side distal to the power receiver; when the shaft-side terminal is pushed into the recess, the shaft-side terminal pushes and moves the other end of the first wire rods on the side proximal to the power receiver, so that the other end of the first wire rods on the side proximal to the power receiver is separated from one end of the first wire rods on the side distal to the power receiver;

among the plurality of second wire rods, the second wire rod that is the closest to the power receiver is configured such that one end of the second wire rod on the side proximal to the power receiver is connected to the power receiver, and the other end of the second wire rod on the side distal to the power receiver extends out into the recess that is the closest to the power receiver among the recesses in which the other of the pair of shaft-side terminals of each set is disposed, whereas the second wire rods other than the second wire rod that is the closest to the power receiver are configured such that one end of the second wire rods on the side proximal to the power receiver and the other end of the second wire rods on the side distal to the power receiver respectively extend out into the recesses that are adjacent to each other in the axial direction of the device shaft and in which the other of the pair of shaft-side terminals of each set is disposed;

the plurality of second wire rods are configured such that the other ends of the second wire rods are individually supported by a spring and disposed in the recesses; by pushing the shaft-side terminal into the recesses, the shaft-side terminal is brought into contact with the other end of the second wire rods disposed in the recesses;

when the shaft-side terminal is not pushed into the recesses into which one end of the second wire rods on the side distal to the power receiver and the other end of the second wire rods on the side proximal to the power receiver extend out, the other end of the second wire rods on the side proximal to the power receiver is lifted up by an elastic force of the spring, whereby the other end of the second wire rods comes into contact with one end of the second wire rods on the side distal to the power receiver; when the shaft-side terminal is pushed into the recesses, the shaft-side terminal pushes and moves the other end of the second wire rods on the side proximal to the power receiver, so that the other end of the second wire rods on the side proximal to the power receiver is separated from one end of the second wire rods on the side distal to the power receiver.

Item 12. The power supply device according to any one of Items 1 to 11, wherein
the power source is a DC or AC power source, and
the power receiver outputs microwaves when DC or AC power is supplied from the power source.

Item 13. The power supply device according to any one of Items 1 to 11, wherein
the power source is a DC or AC power source, and
the power receiver outputs a radio-frequency wave when DC or AC power is supplied from the power source.

Item 14. A power supply device comprising:
a port site formed of an insulating material and comprising a through-hole;
a port site-side terminal provided on an inner surface of the through-hole of the port site;
a port site-side power supply line connecting the port site-side terminal to a power source;
a device shaft that is insertable into the through-hole;
a power receiver provided on the device shaft;
a shaft-side terminal provided on an outer surface of the device shaft; and
a shaft-side power supply line provided on the device shaft to connect the power receiver and the shaft-side terminal;
wherein the power receiver comprises at least a microwave oscillator and a microwave amplifier;
insertion of the device shaft into the through-hole of the port site enables the port site-side terminal and the shaft-side terminal to be in contact with each other;
in the state in which the port site-side terminal is in contact with the shaft-side terminal, electric power from the power source is supplied to the power receiver by means of the port site-side power supply line, the port site-side terminal, the shaft-side terminal, and the shaft-side power supply line;
the power source is a DC power source;
the microwave oscillator oscillates microwaves by using DC power supplied from the power source to the power receiver as a DC power source; and
the microwave amplifier amplifies microwaves by using DC power supplied from the power source to the power receiver as a DC power source.

Item 15. A power supply device comprising:
a port site formed of an insulating material and comprising a through-hole;

a port site-side terminal provided on the inner surface of the through-hole of the port site;

a port site-side power supply line connecting the port site-side terminal to a power source;

a device shaft that is insertable into the through-hole;

a power receiver provided on the device shaft;

a shaft-side terminal provided on an outer surface of the device shaft; and a shaft-side power supply line provided on the device shaft to connect the power receiver and the shaft-side terminal;

wherein the power receiver comprises at least a converter, a microwave oscillator, and a microwave amplifier;

insertion of the device shaft into the through-hole of the port site enables the port site-side terminal and the shaft-side terminal to be in contact with each other;

in the state in which the port site-side terminal is in contact with the shaft-side terminal, electric power from the power source is supplied to the power receiver by means of the port site-side power supply line, the port site-side terminal, the shaft-side terminal, and the shaft-side power supply line;

the power supply is an AC power source;

the converter converts AC power supplied from the power source to the power receiver to DC power; the microwave oscillator oscillates microwaves by using DC power converted by the converter as a DC power source; and the microwave amplifier amplifies microwaves by using DC power converted by the converter as a DC power source.

Item 16. The power supply device according to Item 14 or 15, wherein the microwaves have a frequency of 2.45 GHz±50 MHz, the microwave amplifier has a power conversion efficiency of 50% or more, and electric power supplied from the power source to the power receiver is 10 W or more and 150 W or less.

Advantageous Effects of Invention

According to the power supply device, movement of the device shaft is not restricted because the port site-side power supply line is connected to the port site-side terminal provided on the port site. This enables fine operation of the device shaft, and achieves increased patient safety when the power supply device is used in surgery.

Further, according to the power supply device of the present invention, electric power is supplied to the power receiver by a simple mechanism in which contact of the port site-side terminal with the shaft-side terminal connects a power supply route on the power source side (the port site-side power supply line and the port site-side terminal) and a power supply route on the power receiver side (the shaft-side terminal and the shaft-side power supply line). Therefore, according to the power supply device of the present invention, supply of electric power to the power receiver can be achieved at a low cost.

Further, according to the power supply device of the present invention, since the port site-side terminal and the power source are connected by using a power supply line without using a rigid coaxial cable, the load applied to the device shaft from the port site during the operation of the device shaft in the state in which the device shaft is inserted in the port site can be reduced to a small level. Therefore, the device shaft can be easily operated in the state in which the device shaft is inserted into the port site (for example, in the state in which the device shaft is inserted into the port site, the operation of tilting the device shaft in order to change the angle of the device shaft and port site can be easily performed).

BRIEF DESCRIPTION OF DRAWINGS

FIG. 1(a) is a schematic side view of the power supply device. FIG. 1(b) is a schematic longitudinal sectional view of the power supply device.

FIG. 5(a) shows the state when the tip side of the device shaft is located in the through-hole. FIG. 5(b) shows the state when the length of the tip side of the device shaft extending from one end of the port site is the shortest under the condition in which the port site-side terminal and the shaft-side terminal are in contact with each other. FIG. 5(c) shows the state in which the length of the tip side of the device shaft extending from one end of the port site is the longest under the condition in which the port site-side terminal and the shaft-side terminal are in contact with each other.

FIG. 7(a) shows the state in which shaft-side terminals 6Aa, 6Ba and port site-side terminals 3A, 3B are in contact with each other. FIG. 7(b) shows the state in which the shaft-side terminal 6Ab, 6Bb and port site-side terminals 3A, 3B are in contact with each other.

FIG. 9(a) shows the state in which shaft-side terminals 6Ca, 6Da and port site-side terminals 3A, 3B are in contact with each other. FIG. 9(b) shows the state in which shaft-side terminals 6Cb, 6Db and port site-side terminals 3A, 3B are in contact with each other.

FIG. 13 shows the state in which shaft-side terminals 6Ca, 6Da and port site-side terminals 3A, 3B are in contact with each other.

FIG. 14 illustrates the state in which the shaft-side terminals 6Cb, 6Db and the port site-side terminals 3A, 3B are in contact with each other.

DESCRIPTION OF EMBODIMENTS

Figure 1:
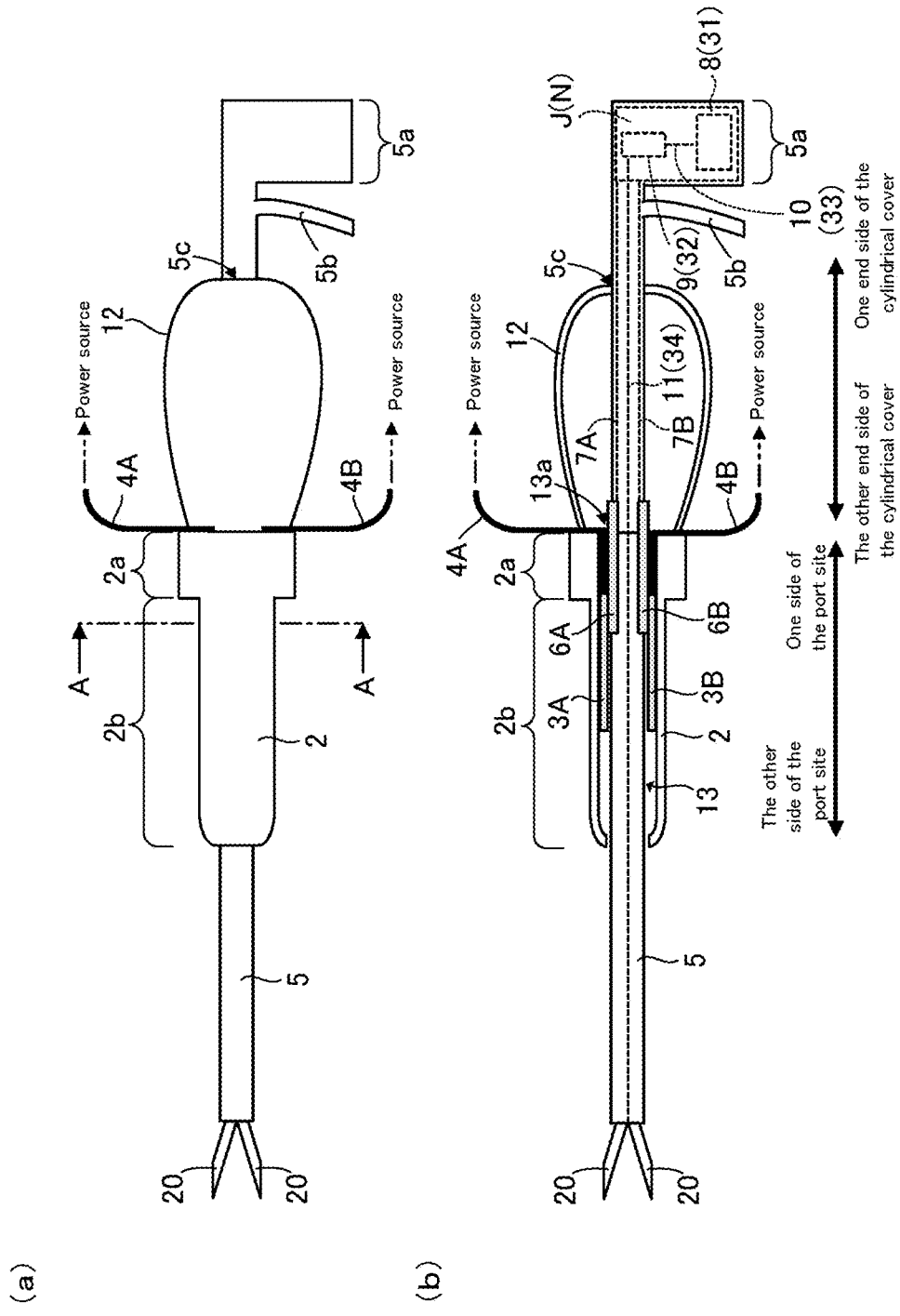
FIG. 1 is a diagram illustrating a power supply device according to one embodiment of the present invention.
Figure 2:
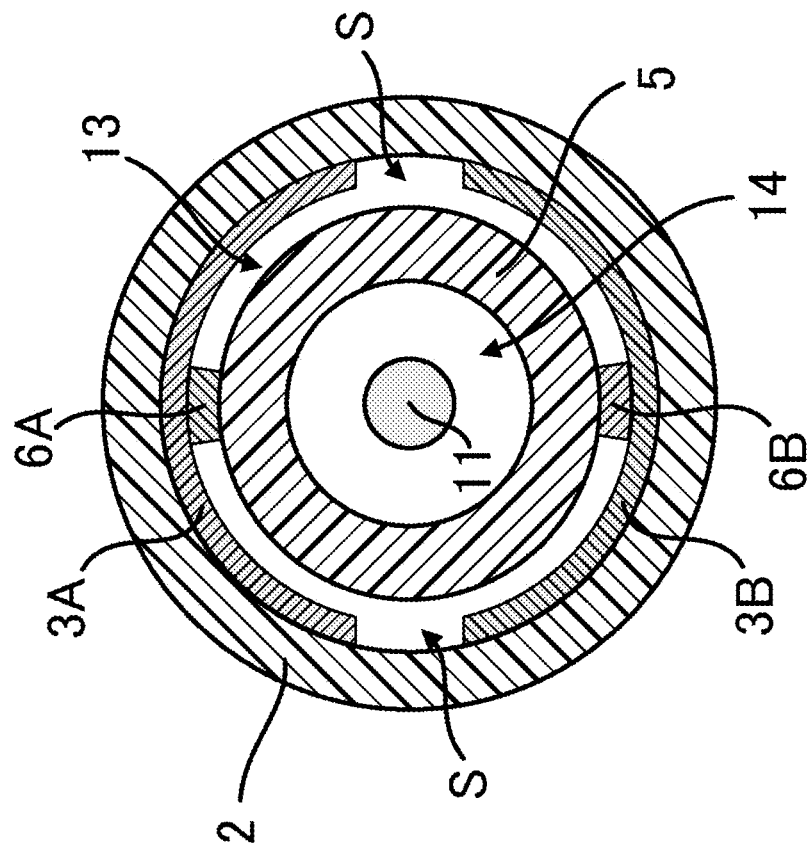
FIG. 2 is a schematic cross-section of the power supply device cut at line A-A in FIG. 1(a).
Figure 3:
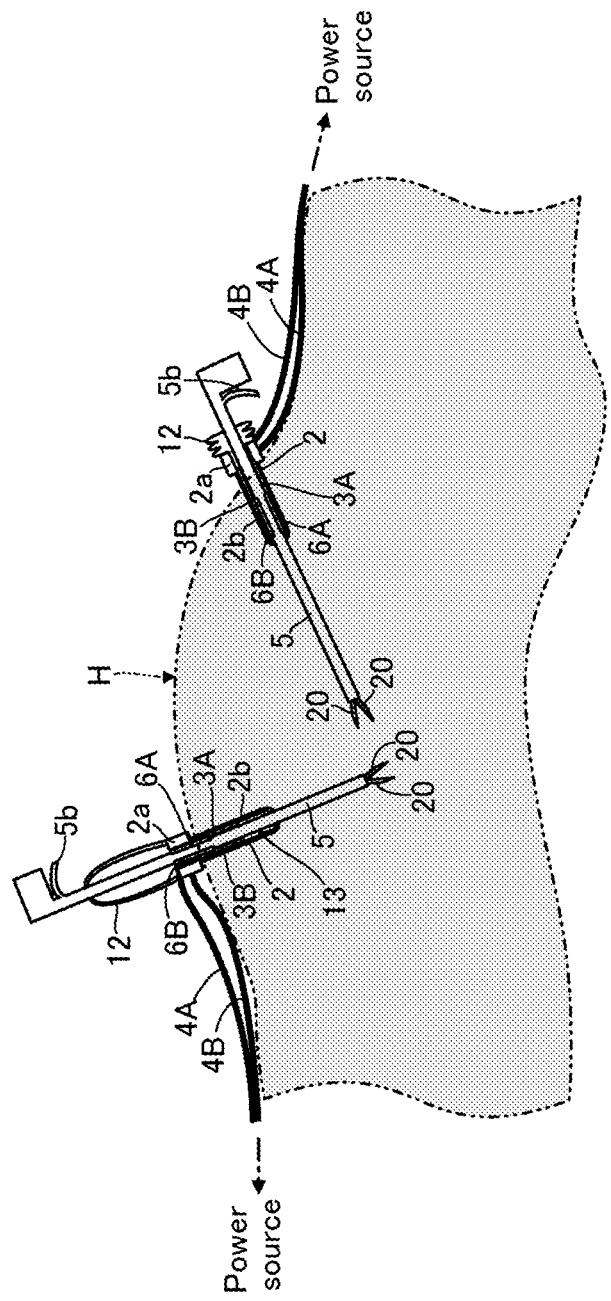
FIG. 3 is a schematic diagram illustrating the state in which the power supply device is in use.
Figure 4:
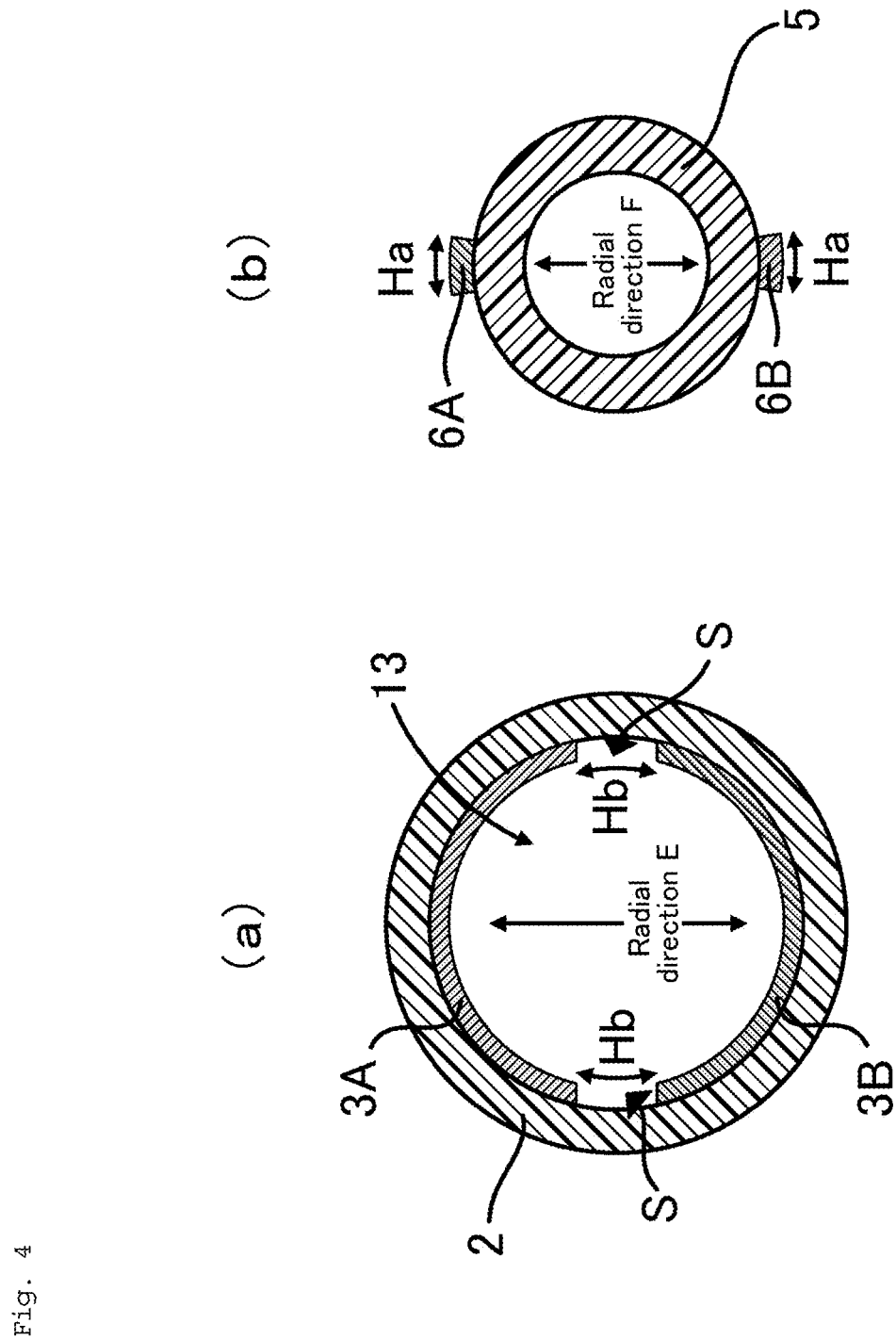
FIG. 4(a) is a schematic cross-section of the port site 2 of the power supply device shown in FIG. 1.
FIG. 4(b) is a schematic cross-section of the device shaft 5 of the power supply device shown in FIG. 1.

Embodiments of the present invention are described below in detail with reference to the accompanying drawings. FIG. 1(a) is a schematic side view of the power supply device according to one embodiment of the present invention. FIG. 1(b) is a schematic longitudinal sectional view of the power supply device according to the embodiment of the present invention. FIG. 2 is a schematic cross-section of the power supply device cut along line A-A in FIG. 1(a). FIG. 3 is a schematic diagram showing the state in which the power supply device is in use. FIG. 4(a) is a schematic cross-section of the port site 2 of the power supply device shown in FIG. 1. FIG. 4(b) is a schematic cross-section of the device shaft 5 of the power supply device shown in FIG. 1.

The power supply device according to this embodiment is used for surgery inside the body of a subject H (FIG. 3). As shown in FIGS. 1 to 3, the power supply line according to this embodiment comprises a port site 2, a pair of port site-side terminals 3A, 3B, port site-side power supply lines 4A, 4B, a device shaft 5, a pair of shaft-side terminals 6A, 6B, shaft-side power supply lines 7A, 7B, a power receiver J, a first coaxial cable 10, a second coaxial cable 11, and a cylindrical cover 12.

The port site 2 is a cylindrical body comprising a through-hole 13 having a circular cross-section and is formed of an insulating material, such as resin. In the example shown in the figures, the port site 2 comprises a large-diameter portion 2a and a long, narrow small-diameter portion 2b that extends from the large-diameter portion 2a. The through-hole 13 penetrates the large-diameter portion 2a and the small-diameter portion 2b.

A pair of port site-side terminals 3A, 3B are formed of metal foil and are provided on the inner surface of the through-hole 13 of port site 2. The pair of port site-side terminals 3A, 3B are positioned opposite to each other in a radial direction E of the port site 2 (FIG. 4(a)) and individually fixed to the port site 2 by using a screw or an adhesive. The "port site-side terminals 3A, 3B are positioned opposite to each other in a radial direction E" means that the center of the width of the terminal 3A and the center of the width of the terminal 3B are on the same straight line extending in a radial direction E. The port site-side terminals 3A, 3B each have a length that is less than half the circumference of the port site 2. In the circumferential direction of the port site 2, a gap S (FIG. 2) is provided between ends of port site-side terminals 3A, 3B on one side and between ends of the port site-side terminals 3A, 3B on the other side. The port site-side terminals 3A, 3B may be formed by applying metal powder to the inner surface of the through-hole 13.

The port site-side power supply lines 4A, 4B are DC power supply lines. The port site-side power supply line 4A connects the port site-side terminal 3A to one electrode of a DC power source, whereas the port site-side power supply line 4B connects the port site-side terminal 3B to the other electrode of the DC power source. When a user turns on a switch (e.g., a foot switch) connected to the DC power source, voltage can be applied to the port site-side terminals 3A, 3B via the port site-side power supply lines 4A, 4B. When the user turns off the switch, application of the voltage to the terminals 3A and 3B can be stopped. In the example shown in the figures, in order to connect the port site-side power supply lines 4A, 4B to the port site-side terminals 3A, 3B, the port site-side power supply lines 4A, 4B are inserted from an opening 13a at one end of the port site 2 into the through-hole 13.

Figure 5:
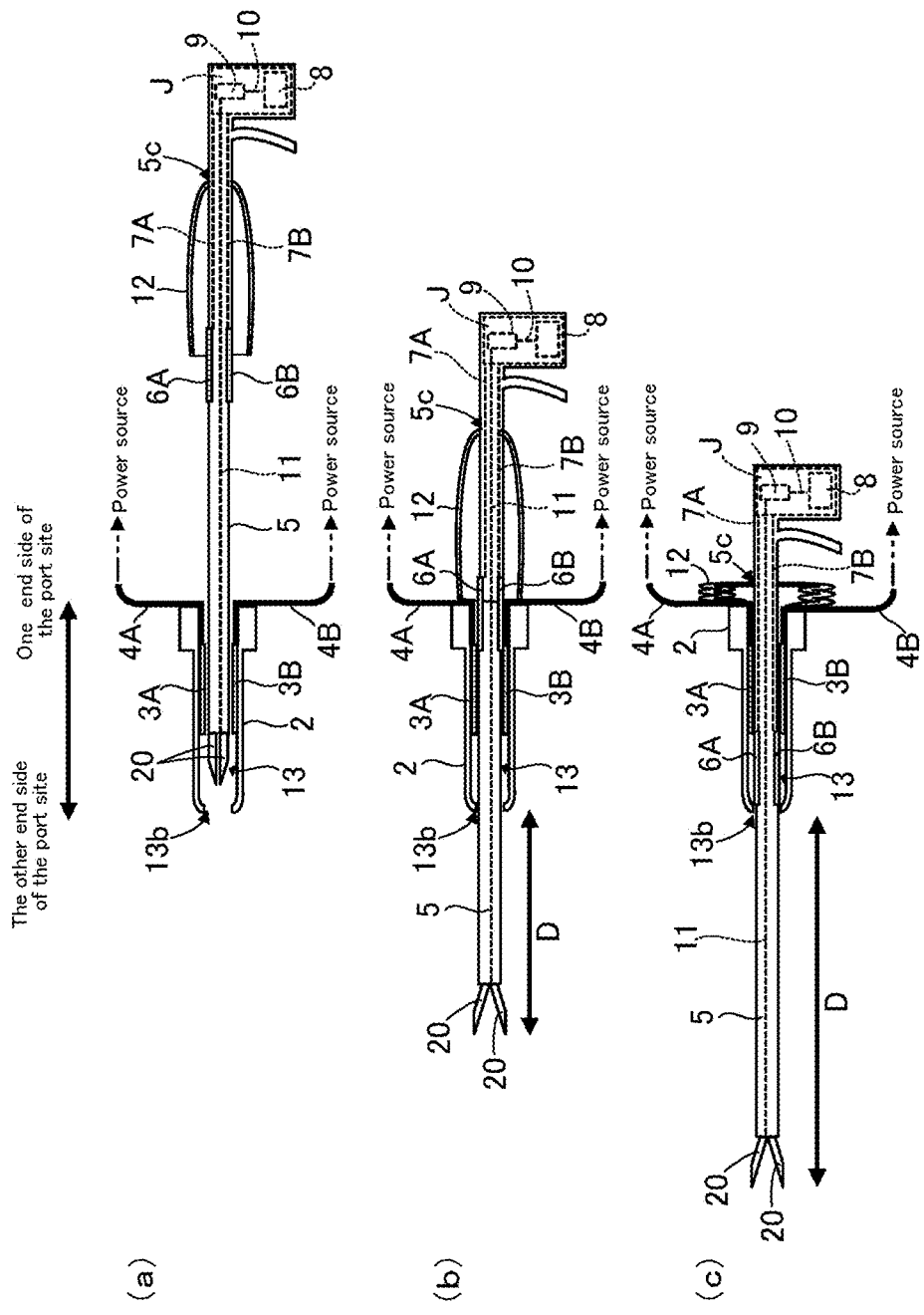
FIG. 5 is a schematic longitudinal cross-section view of the process of inserting the device shaft into the through-hole.

The drive shaft 5 is a cylindrical body formed of an insulating material, such as resin, and can be inserted into the through-hole 13 of port site 2 (FIG. 5 is a schematic longitudinal sectional view showing the process of inserting the device shaft 5 into the through-hole 13 of the port site 2. FIG. 5(a) illustrates the state in which the tip side of the device shaft 5 is positioned in the through-hole 13. FIG. 5(b) and FIG. 5(c) illustrate the state in which the tip side of the device shaft 5 extends out from the opening 13b of the through-hole 13 at the opposite end of the port site 2).

The device shaft 5 comprises a longitudinally extending cavity 14 (FIG. 2). A grip 5a for an operator to grasp (FIG. 1) is provided on the base end side of the device shaft 5 in such a manner as to project radially outward. The grip 5a has a hollow structure, and the cavity 14 of the device shaft 5 (FIG. 2) extends from the inner space of the grip 5a (FIG. 1) to the tip of the device shaft 5. A power receiver J configured to output microwaves when DC power is supplied from a power source is provided in the inner space of the grip 5a. The power receiver J comprises a microwave oscillator 8 and a microwave amplifier 9. The microwave oscillator 8 oscillates microwaves by using DC power supplied from the power source to the power receiver J as a DC power source. The microwave amplifier 9 amplifies the microwave oscillated by the microwave oscillator 8 by using DC power supplied from the power source to the power receiver J as a DC power source.

A pair of shaft-side terminals 6A, 6B are formed of metal foil and are provided on the outer surface of the device shaft 5. The pair of shaft-side terminals 6A, 6B are positioned opposite to each other in a radial direction F of the device shaft 5 (FIG. 4(b)) and are individually fixed to the device shaft 5 by using a screw or an adhesive. The "shaft-side terminals 6A, 6B are positioned opposite to each other in a radial direction F" means that the center of the width of the terminal 6A and the center of the width of the terminal 6B are on the same straight line extending in a radial direction F. The width Ha of the shaft-side terminals 6A, 6B (FIG. 4(b)) is shorter than the width Hb of the gap S (FIG. 4(a)). The shaft-side terminals 6A, 6B may be formed by applying metal powder to the outer surface of the device shaft 5.

As shown in FIG. 1(b), the shaft-side power supply lines 7A, 7B, the first coaxial cable 10, and the second coaxial cable 11 are provided on the device shaft 5.

The shaft-side power supply lines 7A, 7B are DC power supply lines. The shaft-side power supply line 7A connects the shaft-side terminal 6A and the power receiver J. The shaft-side power supply line 7B connects the shaft-side terminal 6B and the power receiver J. The shaft-side power supply lines 7A, 7B are, for example, configured to pass through the cavity 14 of the device shaft 5. In this case, one end of each of the shaft-side power supply lines 7A, 7B enters the inner space of the grip 5a and is connected to the power receiver J (FIG. 1(b)). The other end of each of the shaft-side power supply lines 7A, 7B is configured to penetrate the wall of the device shaft 5 in a radial direction F (FIG. 4(b)). The other end of each of the shaft-side power supply lines 7A, 7B, which extends radially outward from the device shaft 5, is connected to the shaft-side terminals 6A, 6B.

The first coaxial cable 10 is disposed in the inner space of the grip 5a and connects the microwave oscillator 8 and the microwave amplifier 9.

The second coaxial cable 11 passes through the cavity 14 of the device shaft 5 (FIG. 2) and extends from the microwave amplifier 9 to the tip of the device shaft 5.

In the example shown in the figures, a pair of blades 20, 20 is provided at the tip (operation part) of the device shaft 5, and a second coaxial cable 11 connects the microwave amplifier 9 and blades 20, 20. The blades 20, 20 are, for example, as in the tapered coaxial body disclosed in JP2018-11994A, configured such that the central conductor and the external conductor end are exposed and an insulator is disposed between the central conductor and the external conductor end, and microwaves can be supplied to the central conductor via the second coaxial cable 11.

In this embodiment, a wire or shaft, not shown in the figure, is connected to the blades 20, 20. The blades 20, 20 can be opened and closed by pushing or pulling the wire or shaft. For example, the wire or shaft (not shown) is configured to pass through the cavity 14 of the device shaft 5. The wire or shaft is pushed or pulled by operating a trigger 5b connected to the base end side of the device shaft 5, whereby the blades 20, 20 can be opened and closed. By providing a drive mechanism on the device shaft 5 to rotate the wire or shaft around the axis, the blades 20, 20 can be configured to be rotatable with the rotation of the wire or shaft. The drive mechanism is provided, for example, in the grip 5a.

The cylindrical cover 12 is provided in such a manner as to allow the device shaft 5 to pass inside the cover 12 and is formed of a stretchable insulating material (e.g., resin). One end of the cylindrical cover 12 is fixed to the outer surface of the device shaft 5 at a midway position 5c of the device shaft 5. The shaft-side terminals 6A, 6B are provided on the tip side of the device shaft 5 (left side in FIG. 1) relative to the midway position 5c of the device shaft 5. The "fixing one end of the cylindrical cover 12 . . . at a midway position 5c of the device shaft 5" can be achieved, for example, by matching the inside diameter of the opening on one end of the cylindrical cover 12 with the outside diameter of the device shaft 5 at the position 5c (in this case, one end of the cylindrical cover 12 is fixed to the position 5c of the device shaft 5 by a frictional force generated between the opening edge of one end of the cylindrical cover 12 and the outer surface at the position 5c of the device shaft 5). One end of the cylindrical cover 12 may be fixed to the midway position 5c of the device shaft 5 by using an adhesive.

According to the power supply device of this embodiment, when the device shaft 5 is inserted into the through-hole 13 from one end of port site 2 as shown in FIG. 5(a) and the tip side of the device shaft 5 extends out from the other end of the port site 2 as shown in FIGS. 5(b) and 5(c), one terminal 6 of the shaft-side terminals 6A, 6B can be brought into contact with the port site-side terminal 3A, whereas the other terminal 6 can be brought into contact with the port site-side terminal 3B (FIG. 5(b) shows the state in which the length D of the device shaft 5 that extends out from the other end of the port site 2 is the shortest under the condition in which the terminals 3, 6 are in contact with each other. FIG. 5(c) shows the state in which the length D of the device shaft 5 that extends out from the other end of the port site 2 is the longest under the condition in which the terminals 3, 6 are in contact with each other). FIG. 5(b) and FIG. 5(c) show that the terminal 6A is in contact with the terminal 3A, whereas the terminal 6B is in contact with the terminal 3B. By rotating the device shaft 5 relative to the port site 2 from this state, it is also possible to bring the terminal 6B into contact with the terminal 3A and bring the terminal 6A into contact with the terminal 3B, opposite from the above. The "one terminal 6 of the shaft-side terminals 6A, 6B is in contact with the port site-side terminal 3A, whereas the other terminal 6 is in contact with the port site-side terminal 3B" may be briefly referred to below as "the port site-side terminal 3 and the shaft-side terminal 6 are in contact with each other."

Bringing the port site-side terminal 3 into contact with the shaft-side terminal 6 as described above connects a power supply route on the power source side (a power supply route composed of the power supply lines 4A, 4B and the terminals 3A, 3B) and a power supply route on the power receiver J side (a power supply route composed of the terminals 6A, 6B and the power supply lines 7A, 7B), whereby DC power from a DC power source can be supplied to the power receiver by means of the port site-side power supply lines 4A, 4B, the port site-side terminals 3A, 3B, the shaft-side terminals 6A, 6B, and the shaft-side power supply lines 7A, 7B. For example, as shown in FIG. 5(b) and FIG. 5(c), in the state in which the terminals 3A and 6A are in contact with each other and the terminals 3B and 6B are in contact with each other, the DC power flows in the following direction: from the positive pole of the DC power source→power supply line 4A→terminal 3A→terminal 6A→power supply line 7A→power receiver J→power supply line 7B→terminal 6B→terminal 3B→power supply line 4B→the negative pole of the DC power source. Unlike the example shown in the figures, in the state in which the terminals 3A and 6B are in contact with each other and the terminals 3B and 6A are in contact with each other, the DC power flows in the following direction: from the positive pole of the DC power source→power supply line 4A→terminal 3A→terminal 6B→power supply line 7B→power receiver J→power supply line 7A→terminal 6A→terminal 3B→power supply line 4B→negative pole of the DC power source.

In the state in which the port site-side terminal 3 and the shaft-side terminal 6 are in contact with each other as described above (the state in which the power supply route on the power source side and the power supply route on the power receiver J side are connected), DC power is supplied to the microwave oscillator 8 and the microwave amplifier 9 of the power receiver J to allow the microwave oscillator 8 to oscillate a microwave, while the oscillated microwave is supplied to the microwave amplifier 9 via the first coaxial cable 10 and amplified, and the amplified microwave is then supplied via the second coaxial cable 11 to the central conductor at the tip of the device shaft 5 (blades 20, 20) and can be emitted from the central conductor. The frequency of the microwave emitted from the central conductor is not limited; however, it is preferably 300 MHz to 6 GHz, and more preferably 2.45 GHz±50 MHz.

As described above, bringing the port site-side terminal 3 into contact with the shaft-side terminal 6 upon insertion of the device shaft 5 into the through-hole 13 can be achieved by adjusting, for example, the installation position, length, and thickness of the port site-side terminal 3 and the shaft-side terminal 6; the inner diameter of the port site 2; and outer diameter of the device shaft 5.

In the power supply device according to this embodiment, as shown in FIG. 5(b) and FIG. 5(c), in the state in which the port site-side terminal 3 and the shaft-side terminal 6 are in contact with each other, one end of the port site 2 and the other end of the cylindrical cover 12 are in contact with each other, and the entirety of shaft-side terminal 6 is housed in a space composed of the inside of the cylindrical cover 12 and the through-hole 13 of the port site 2. This is for preventing the operator from receiving an electric shock due to contact with the terminal 6. This can be achieved by controlling, for example, the length of the port site 2, cylindrical cover 12, port site-side terminal 3, and shaft-side terminal 6; the fixing position 5c of one end of the cylindrical cover 12; and positions of the port site-side terminal 3 and the shaft side-terminal 6. Since the cylindrical cover 12 is formed of a stretchable insulating material as described above, as the fixing position 5c of one end of the cylindrical cover 12 is closer to the port site 2 upon insertion and passing of the device shaft 5 through the through-hole 13, the cylindrical cover 12 is gradually compressed (FIG. 5(a) and FIG. 5(b) show the state in which the cylindrical cover 12 is not compressed; and FIG. 5(c) shows the state in which the cylindrical cover 12 is compressed).

When the power supply device according to this embodiment is used in surgery, the first step is to pierce the body wall of a subject H to install the port site 2 therein (FIG. 3). In this step, the orientation of the port site 2 is adjusted so that one end of the port site 2 is positioned outside the body, whereas the other end of the port site 2 enters the body. When the port site 2 has a large-diameter portion 2a on one end side and has a small-diameter portion 2b on the other end side as in the example shown in the figure, for example, the small-diameter portion 2b is inserted into the body until the large-diameter portion 2a comes in contact with the surface of the body wall.

Subsequently, the port site-side power supply lines 4A, 4B are secured to the body wall surface of the subject H.

The device shaft 5 is then inserted through the through-hole 13 from one end side of the port site 2, so that the tip side of the device shaft 5 extends out from the other end of the port site 2 into the body to position the blades 20, 20 (the tip of device shaft 5) at the surgical site in the body. In this step, the blades 20, 20 are opened and closed by operation of a trigger 5b to clamp the site to be coagulated and cut with the blades 20, 20 to perform coagulation (hemostasis) and cutting operations.

When the port site-side terminal 3 and the shaft-side terminal 6 are in contact with each other in the state in which the blades 20, 20 are positioned at the surgical site of the body as described above, the blades can be operated at the surgical site by turning on a switch connected to the power source. That is, when the switch is turned on, DC power is supplied to the power receiver J so that microwaves are oscillated from the microwave oscillator 8 and the microwaves are concurrently supplied to the microwave amplifier 9 and amplified, and the amplified microwaves are supplied to the central conductors of the blades 20, 20 and are emitted at the site to be coagulated and cut, whereby the surgical site is coagulated to perform hemostasis. The microwaves emitted from the central conductor to the surgical site flow to outer conductors of the blades 20, 20 that are present in the vicinity. If the switch is turned on and the device shaft 5 is inserted into the through-hole 13 of the port site 2 to bring the port site-side terminal 3 and the shaft-side terminal 6 into contact with each other, DC power is supplied to the power receiver J and microwaves are emitted from the blades 20, 20 (tips of the device shaft 5) immediately after the terminals 3, 6 come into contact with each other.

According to the power supply device of this embodiment described above, electric power is suppliable to the power receiver J by a simple mechanism in which contact between the port site-side terminal 3 and the shaft-side terminal 6 connects the power supply route on the power source side (the power supply lines 4A, 4B and the terminals 3A, 3B) and the power supply route on the power receiver J side (the terminals 6A, 6B and the power supply lines 7A, 7B). Therefore, the power supply device according to this embodiment can achieve supply of electric power to the power receiver J at a low cost.

Further, according to the power supply device of this embodiment, since the power supply lines 4A, 4B on the power source side are connected to the terminals 3A, 3B of the port site 2, movement of the device shaft 5 is not restricted, unlike in the case in which the power supply line on the power source side is connected to the device shaft 5. This enables fine operation of the device shaft 5 and achieves increased safety of the subject H.

Further, according to the power supply device of this embodiment, since the port site-side power supply lines 4A, 4B are connected to the port site 2 that is installed into the body wall of the subject H by piercing, the power supply lines 4A, 4B can be fixed along the surface of the body wall of the subject H, as shown in FIG. 3. Since this prevents the power supply lines 4A, 4B from being intricately present in the space on the operating table, surgical support operations can proceed smoothly.

According to the power supply device of this embodiment, the power supply line 4 is used instead of a rigid coaxial cable to connect the port site-side terminal 3 and the power source. Therefore, when the device shaft 5 is operated to change the state of the device shaft 5 and the port site 2 in the state in which the device shaft 5 is inserted into the port site 2, the load applied to the device shaft 5 from the port site 2 can be reduced to a low level. Therefore, the device shaft 5 can be easily operated (i.e., the state of the device shaft 5 and port site 2 can be easily changed). For example, when an operation of tilting the device shaft 5 to change the angle of the device shaft 5 and the port site 2 is performed, a small load applied to the device shaft 5 from the port site 2 facilitates the operation of tilting the device shaft 5 (that is, the angle of device shaft 5 and port site 2 can be easily changed).

Further, according to the power supply device of this embodiment, the port site-side terminals 3A, 3B are positioned opposite to each other in a radial direction E of the port site 2 (FIG. 4(a)); the shaft-side terminals 6A, 6B are positioned opposite to each other in a radial direction F of the device shaft 5 (FIG. 4(b)); and the width Ha of the shaft-side terminals 6A, 6B (FIG. 4(b)) is smaller than the width Hb of gap S (FIG. 4(a)). Therefore, even if the device shaft 5 rotates during surgery, one terminal 6 (terminal 6A or 6B) never comes in contact with both of the port site-side terminals 3A, 3B simultaneously; therefore, a short circuit between the terminals (electric short-circuit) does not occur.

Further, according to the power supply device of this embodiment, while the port site-side terminal 3 and the shaft-side terminal 6 are in contact with each other and electric power is supplied to the power receiver J, the entirety of the shaft-side terminals 6A, 6B are housed in the space composed of the inside of the cylindrical cover 12 and the through-hole 13 of the port site 2 (FIG. 1(b), FIG. 5(b), and FIG. 5(c)). This can prevent the operator etc. from receiving an electric shock due to contact with the shaft-side terminals 6A, 6B.

Further, according to the power supply device of this embodiment, microwaves, which are emitted from the tip of the device shaft 5 (blades 20, 20), can excite water molecules in the biological tissue of the subject H and heat the biological tissue itself. Therefore, the extent of damage to the surrounding area can be minimized without charring of the living tissue.

The present invention is not limited to the above embodiment and can be modified in various ways. Variations of the present invention are described below. In the following, differences from the above embodiment are mainly described. The same compositional elements as those in the above embodiment have the same reference numerals, and explanations of those elements will be omitted.

Figure 6:
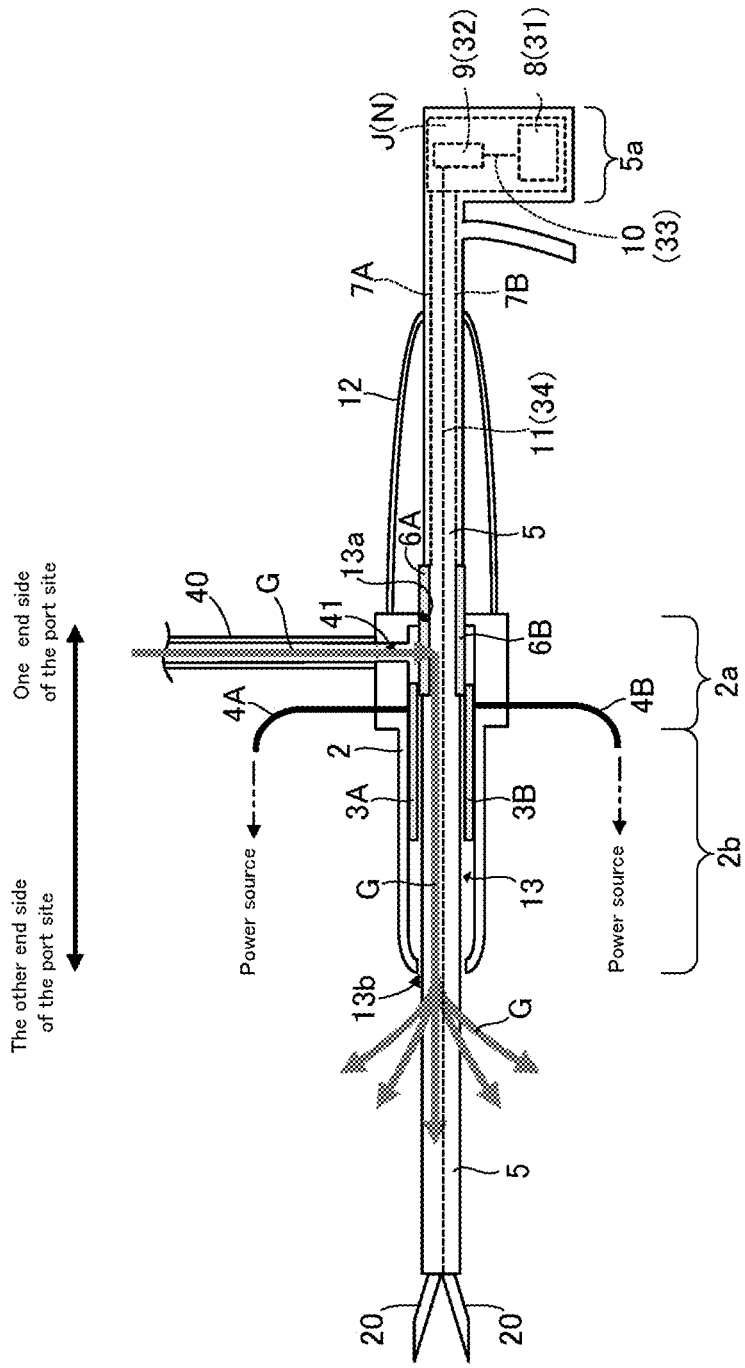
FIG. 6 is a schematic longitudinal sectional view of a power supply device according to a variation of the present invention.

In the above embodiment, an example is shown in which the port site-side power supply lines 4A, 4B are inserted into the through-hole 13 through the opening 13a at one end of the port site 2 (FIG. 1(b)). Alternatively, as shown in FIG. 6, the port site-side power supply lines 4A, 4B may penetrate the cylindrical wall of the port site 2. In this case, ends of the power supply lines 4A, 4B that extend into the through-hole 13 are connected to the port site-side terminals 3A, 3B, respectively. In the example shown in the figure, the port site-side power supply lines 4A, 4B penetrate the cylindrical wall of the large-diameter portion 2a. Alternatively, the port site-side power supply lines 4A, 4B may penetrate the cylindrical wall of the small-diameter portion 2b.

As shown in FIG. 6, by connecting the gas supply tube 40 to the port site 2, the power supply device may be configured to introduce gas G flowing in the gas supply tube 40 into the through-hole 13 and discharge the gas G from the opening 13b of the through-hole 13 at the other end of the port site 2. With this configuration, the body fluid of subject H (FIG. 3) can be prevented from flowing into the through-hole 13 from the opening 13b. In the example shown in FIG. 6, the gas supply tube 40 is connected to the through-hole 41 that penetrates through the cylindrical wall of the port site 2 to thereby introduce the gas G flowing in the gas supply tube 40 into the through-hole 13. Since the diameter of the opening 13a of the through-hole 13 at one end of the port site 2 substantially matches the outer diameter of the device shaft 5, most of the gas G introduced into the through-hole 13 is discharged from the opening 13b at the other end of the port site 2.

Figure 7:
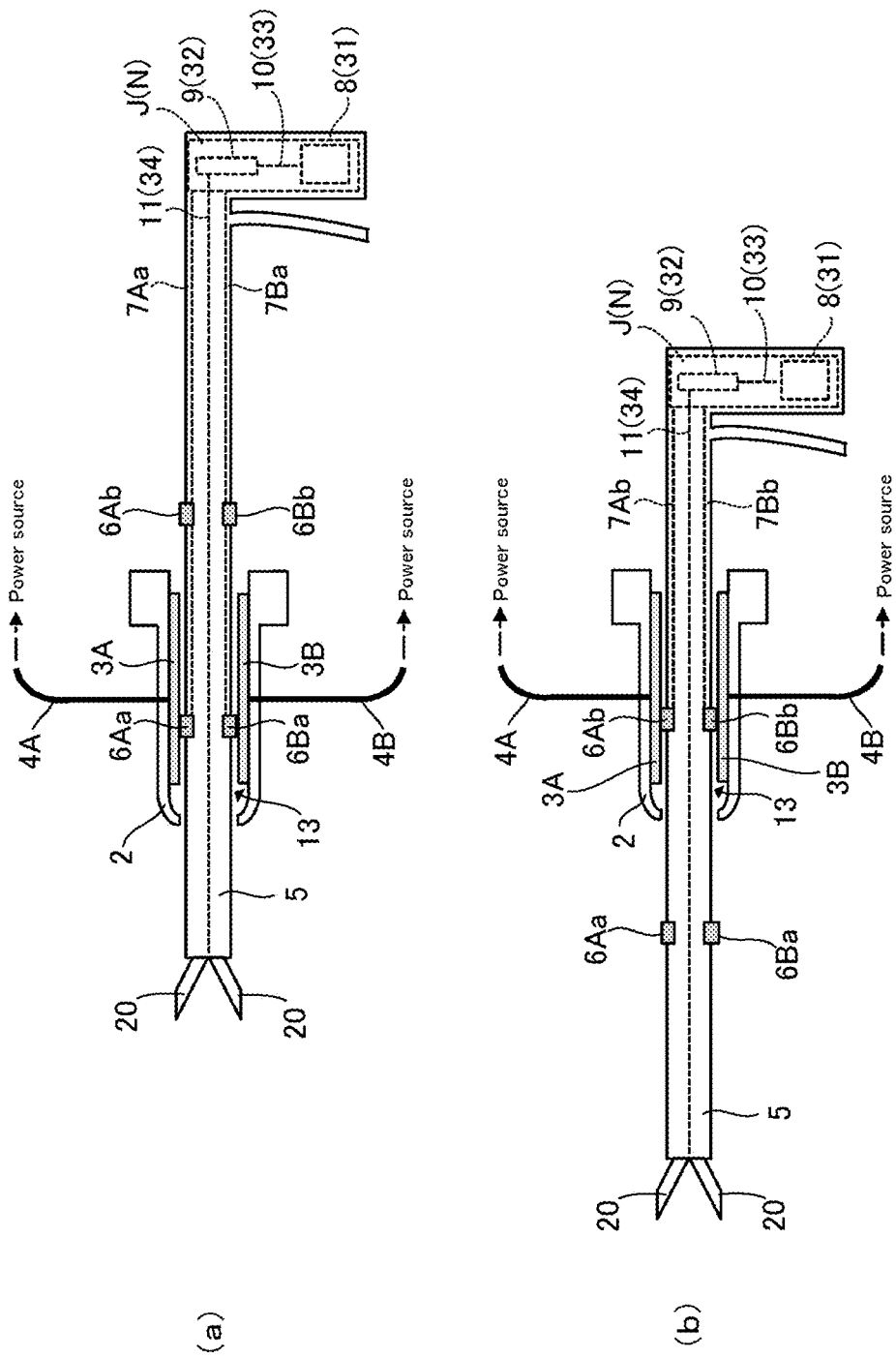
FIG. 7 is a schematic longitudinal sectional view of a power supply device according to a variation of the present invention.
Figure 8:
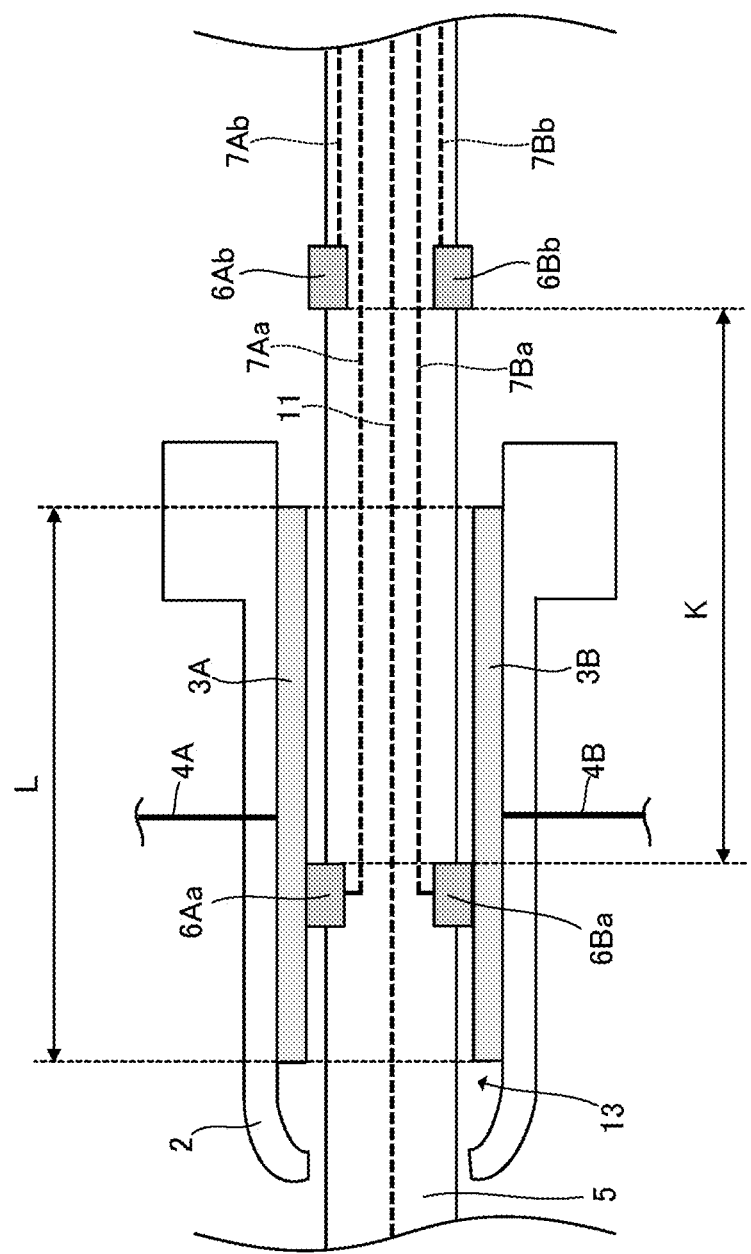
FIG. 8 is a partial enlarged schematic longitudinal sectional view of the power supply device shown in FIG. 7.

In the above embodiment, an example is shown in which one set of shaft-side terminals 6A, 6B is provided on the device shaft 5. Alternatively, as shown in FIGS. 7 and 8, multiple sets of a pair of shaft-side terminals 6A, 6B may be provided so as to be spaced apart from each other in the axial direction of the device shaft 5. In this case, shaft-side power supply lines 7A, 7B for connecting each set of shaft-side terminals 6A, 6B to the power receiver J are provided on the device shaft 5. One set of shaft-side terminals 6A, 6B are placed into the through-hole 13 and brought into contact with the port site-side terminals 3A, 3B to supply DC power to the power receiver J, whereby microwaves can be emitted from the blades 20, 20 (tip of the device shaft 5).

In the example shown in the figures, a pair of terminals 6Aa, 6Ba and a pair of terminals 6Ab, 6Bb are provided so as to be spaced apart from each other in the axial direction of the device shaft 5. The terminal 6Aa is connected to the power receiver J by means of the power supply line 7Aa; terminal 6Ab is connected to the power receiver J by means of the power supply line 7Ab; the terminal 6Ba is connected to the power receiver J by means of the power supply line 7Ba; and terminal 6Bb is connected to the power receiver J by means of the power supply line 7Bb.

As shown in FIG. 7(a) and FIG. 8, in the state in which the terminals 6Aa, 6Ba and terminals 3A, 3B are in contact with each other, DC power from the DC power source can be supplied to the power receiver J by means of the power supply lines 4A, 4B, terminals 3A, 3B, terminals 6Aa, 6Ba, and power supply lines 7Aa, 7Ba, whereby microwaves can be emitted from the blades 20, 20.

As shown in FIG. 7(b), in the state in which the terminals 6Ab, 6Bb and the terminals 3A, 3B are in contact with each other, DC power from the DC power source can be supplied to the power receiver J by means of the power supply lines 4A, 4B, terminals 3A, 3B, terminals 6Ab, 6Bb, and power supply lines 7Ab, 7Bb, whereby microwaves can be emitted from the blades 20, 20.

As shown in FIGS. 7 and 8, when a plurality of pairs of shaft-side terminals 6A, 6B is provided on the device shaft 5, it is preferable that the entirety of one set of terminals 6A, 6B is configured to be housed in the through-hole 13 of the port site 2 in the state in which the one set of terminals 6A, 6B is in contact with terminals 3A, 3B. With this configuration, the operator etc. can be protected from receiving an electric shock due to contact with the terminals 6A, 6B.

Further, the distance K between two sets of shaft-side terminals 6A, 6B adjacent to each other in the axial direction of the device shaft 5 (FIG. 8) is preferably adjusted to be equal to the length L of the port site-side terminals 3A, 3B. With this configuration, immediately after one set of terminals 6A, 6B are separated from the terminals 3A, 3B, another set of terminals 6A, 6B can be brought into contact with the terminals 3A, 3B (in the example shown in the figure, immediately after the terminals 6Aa, 6Ba are separated from the terminals 3A, 3B, terminals 6Ab, 6Bb can be brought into contact with terminals 3A, 3B). This enables continuous supply of DC power to the power receiver J while minimizing the number of terminals 6 provided on the shaft 5.

The above embodiment shows an example in which the shaft-side terminals 6A, 6B are fixed to the outer surface of the device shaft 5 by using screws or an adhesive. Alternatively, the shaft-side terminals 6A, 6B may be attached to the outer surface of device shaft 5 via springs. An example of the power supply device with this modification is described with reference to FIGS. 9 to 12.

Figure 9:
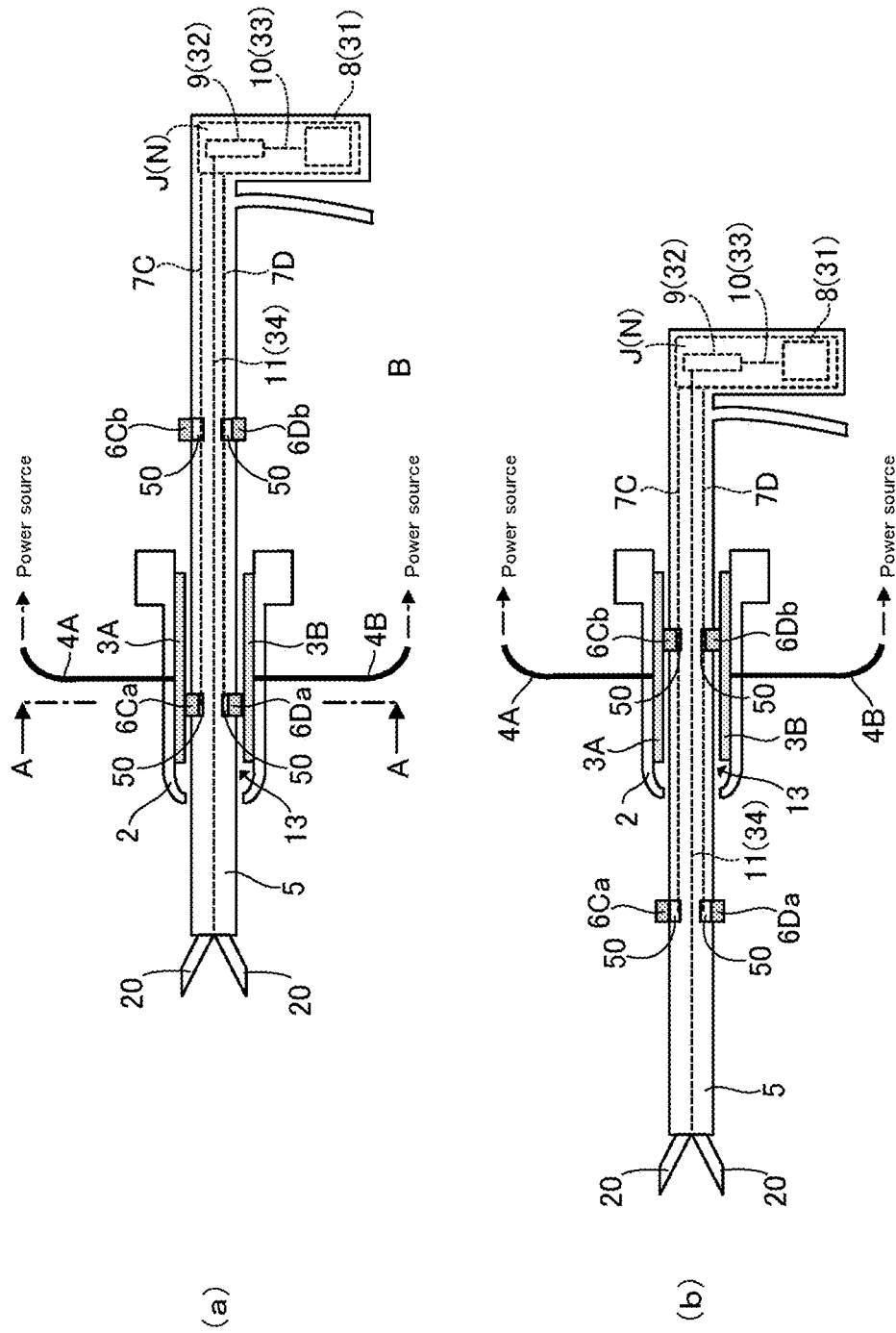
FIG. 9 is a schematic longitudinal sectional view of a power supply device according to a variation of the present invention.
Figure 10:
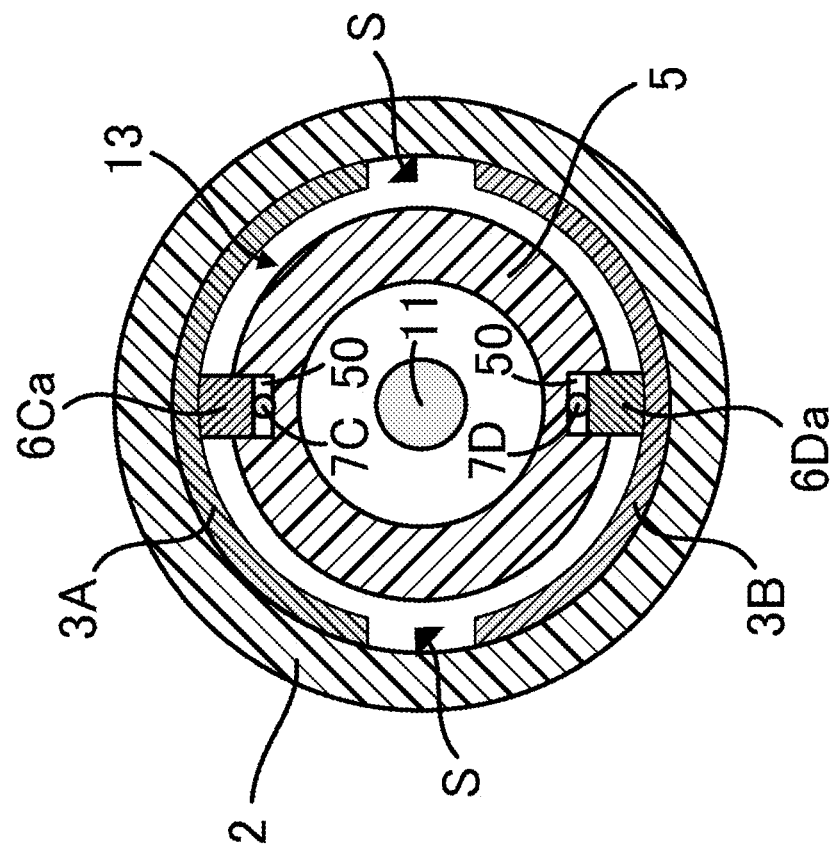
FIG. 10 is a schematic cross-section of the power supply device cut along line A-A shown in FIG. 9(a).
Figure 11:
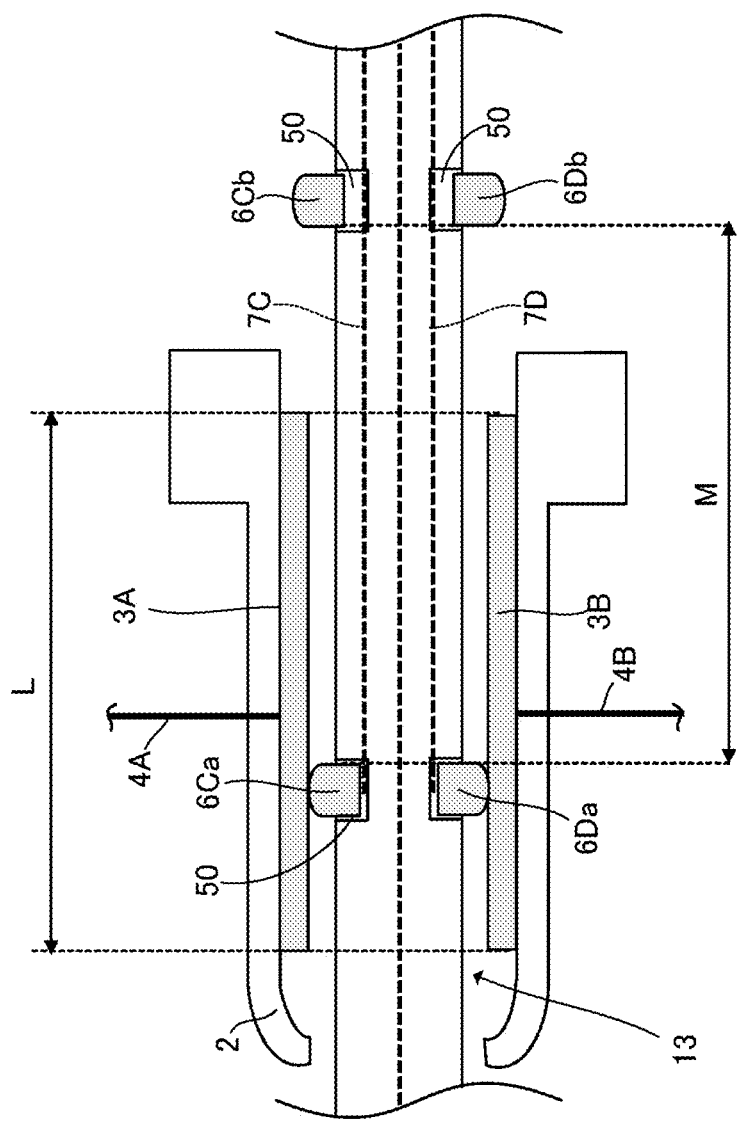
FIG. 11 is a partial enlarged schematic longitudinal sectional view of the power supply device shown in FIG. 9.
Figure 12:
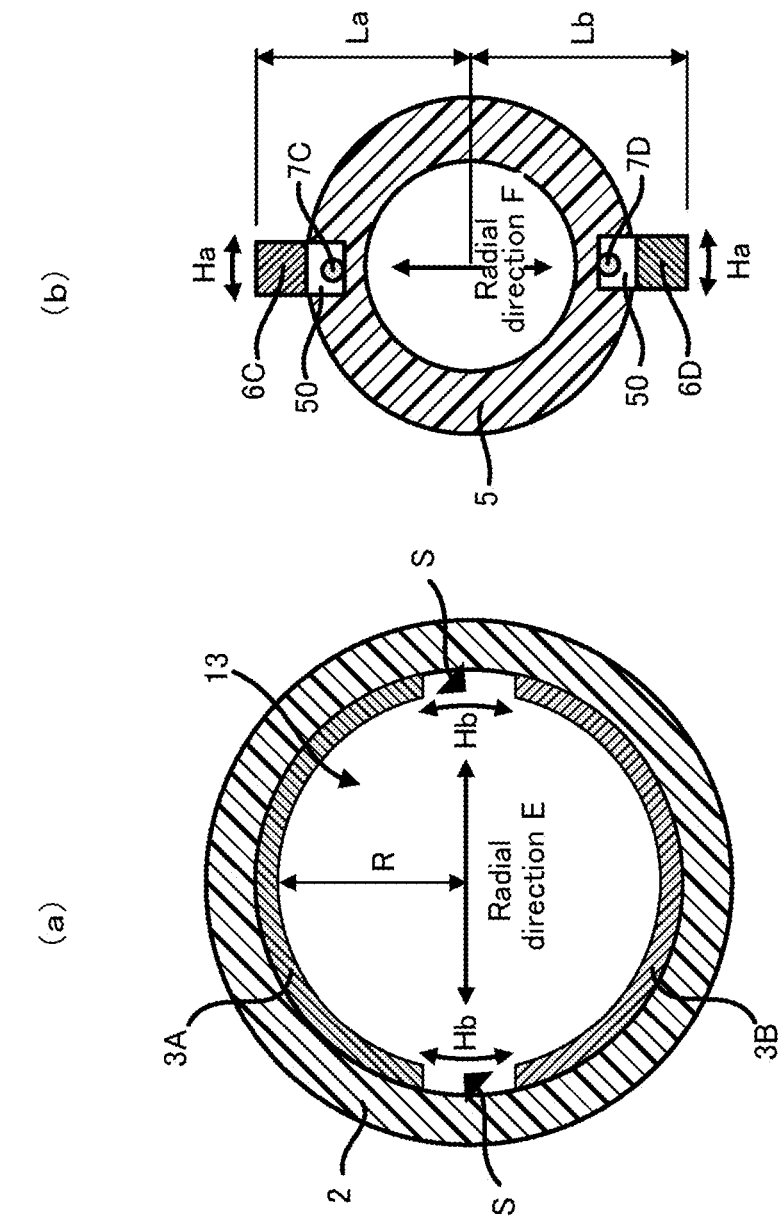
FIG. 12(a) is a schematic cross-section of the port site of the power supply device shown in FIG. 9.
FIG. 12(b) is a schematic cross-section of the device shaft of the power supply device shown in FIG. 9.

FIG. 9 is a schematic longitudinal section view of a power supply device according to a variation of the present invention. FIG. 10 is a schematic cross-section of the power supply device cut along line A-A shown in FIG. 9(a). FIG. 11 is a schematic longitudinal section of the power supply device shown in FIG. 9. FIG. 12(a) is a schematic cross-section of the port site 2 provided in the power supply device shown in FIG. 9. FIG. 12(b) is a schematic cross-section of the device shaft provided in the power supply device 5 shown in FIG. 9.

In the power supply device according to the variation shown in FIG. 9, a pair of shaft-side terminals 6C, 6D are provided on the outer surface of the device shaft 5. The shaft-side terminals 6C, 6D are individually supported by springs (not shown) and disposed in recesses 50 formed in the outer surface of the device shaft 5. The springs may be plate springs or wood springs, and are attached to the outer surface of the device shaft 5 (e.g., the surface of the recesses 50).

The shaft-side terminals 6C, 6D are positioned opposite to each other in the radial direction F of the device shaft 5 (FIG.

12(*b*)). The width Ha of the shaft-side terminals 6C, 6D (FIG. 12(*b*)) is set shorter than the width Hb of the gap S between the port site-side terminals 3A, 3B (FIG. 12(*a*)). The "shaft-side terminals 6C, 6D are positioned opposite to each other in a radial direction F" means that the center of the width of terminal 6C and the center of the width of 6D are on the same straight line extending in a radial direction F.

The device shaft 5 comprises: a first shaft-side power supply line 7C as a power supply line for connecting the shaft-side terminal 6C and the power receiver J; and a second shaft-side power supply line 7D as a power supply line for connecting the shaft-side terminal 6D and the power receiver J. The first and second shaft-side power supply lines 7C, 7D extend in the axial direction of the device shaft 5. The first shaft-side power supply line 7C passes through a recess 50 in which the shaft-side terminal 6C is disposed, whereas the second shaft-side power supply line 7D passes through a recess 50 in which the shaft-side terminal 6D is disposed.

While the shaft-side terminals 6C, 6D are positioned outside the port site 2, the compressed length of the spring supporting the terminals 6C, 6D is short (only the compression due to the weight of the shaft-side terminal 6 occurs in the spring). Therefore, each of the distances La, Lb from the center of the device shaft 5 to the outer edges of the shaft-side terminals 6A, 6B (FIG. 12(*b*)) is larger than the inner diameter R of the through-hole 13 of the port site 2 (FIG. 12(*a*)). Thus, the shaft-side terminal 6C does not come into contact with the first shaft-side power-supply line 7C passing through the recess 50; and the shaft-side terminal 6D does not come into contact with the second shaft-side power supply line 7D passing through the recess 50.

For example, when the user pushes down the shaft-side terminals 6C, 6D with his/her finger to compress the springs supporting terminals 6C, 6D so as to make the distance La, Lb equal to the inside diameter R of the through-hole, the shaft-side terminal 6C can be brought into contact with the first shaft-side power supply line 7C passing through the recess 50, whereas the shaft-side terminal 6D can be brought into contact with the second shaft-side power supply line 7D passing through the recess 50, as shown in FIG. 10. In this state, the shaft-side terminals 6C, 6D are placed into the through-hole 13 of the port site 2, and a terminal 6 that is one of the shaft-side terminals 6C, 6D is brought into contact with the port site-side terminal 3A, whereas a terminal 6 that is the other of the shaft-side terminals 6C, 6D is brought into contact with the port site-side terminal 3B, whereby a power supply route on the power source side (a power supply route composed of the power supply lines 4A, 4B and the terminals 3A, 3B) is connected to a power supply route on the power receiver J (a power supply route composed of the power supply lines 6C, 6D and the terminals 7C, 7D). This allows DC power from the DC power source to be supplied to the power receiver J and enables microwaves to be emitted from the tip of the device shaft 5 (blades 20, 20). Since the port site-side terminals 3A, 3B and the shaft-side terminals 6C, 6D are kept in contact with each other by a reaction force of the spring against compression, electric power can continue to be supplied to the power receiver J.

In the power supply device according to the above variation of the invention, in the state in which the port site-side terminals 3A, 3B and the shaft-side terminals 6C, 6D are in contact with each other by appropriately adjusting the dimensions etc. of the port site 2, the port site-side terminals 3A, 3B, and the shaft-side terminals 6C, 6D, the entirety of the shaft-side terminals 6C, 6D in contact with the port site-side terminals 3A, 3B are preferably housed inside the through-hole 13 of the port site 2. With this configuration, the operator etc. can be protected from receiving an electric shock due to contact with the shaft-side terminals 6C, 6D.

Further, as shown in FIG. 9, multiple sets of shaft-side terminals 6C, 6D may be provided so as to be spaced apart from each other in the axial direction of the device shaft 5. In this case, the first shaft-side power supply line 7C is configured to pass through the recess 50 in which a shaft-side terminal 6C, which is one of the shaft-side terminals of each set, is disposed, and the second shaft-side power supply line 7D is configured to pass through the recess 50 in which a shaft-side terminal 6D, which is the other of the shaft-side terminals of each set, is disposed. (In the example shown in the figure, a set of terminals 6Ca, 6Da and a set of terminals 6Cb, 6Db are provided on the device shaft 5 so as to be spaced apart from each other. The first shaft-side power supply line 7C is configured to pass through the recess 50 in which the terminal 6Ca is disposed and through the recess 50 in which the terminal 6Cb is disposed, whereas the second shaft-side power supply line 7D is configured to pass through the recess 50 in which the terminal 6Da is disposed and through the recess 50 in which the terminal 6Db is disposed.)

In the state in which a terminal 6C, which is one of a set of shaft-side terminals 6C, 6D, is brought into contact with the first shaft-side power supply line 7C passing through the recess 50, and a terminal 6D, which is the other of the set of shaft-side terminals 6C, 6D, is brought into contact with the second shaft-side power supply line 7D passing through the recess 50, one set of shaft-side terminals 6C, 6D are placed into the through-hole 13 of the port site 2 and the terminal 6C, which is one of the set of shaft-side terminals 6C, 6D, is brought into contact with the port site-side terminal 3A, and the terminal 6D, which is the other of the set of shaft-side terminals 6C, 6D, is brought into contact with the port site-side terminal 3B, whereby DC power can be supplied to the power receiver J, which enables microwaves to be emitted from the blades 20, 20 (tip of the device shaft 5).

For example, as shown in FIG. 9(*a*), FIG. 10, and FIG. 11, in the state in which the shaft side terminals 6Ca, 6Da are contacted with the power supply lines 7C, 7D, respectively, and the shaft-side terminals 6Ca, 6Da are contacted with the port site-side terminals 3A, 3B, respectively, DC power from the DC power source can be supplied to the power receiver J by means of the power supply lines 4A, 4B, terminals 3A, 3B, terminals 6Ca, 6Da, and power supply lines 7C, 7D, whereby microwaves can be emitted from the blades 20, 20.

Further, as shown in FIG. 9(*b*), in the state in which the shaft side terminals 6Cb, 6Db are contacted with the power supply lines 7C, 7D, respectively and the shaft-side terminals 6Cb, 6Db are contacted with the port site-side terminals 3A, 3B, respectively, DC power from the DC power source can be supplied to the power receiver J by means of the power supply lines 4A, 4B, terminals 3A, 3B, terminals 6Cb, 6Db, and power supply lines 7C, 7D, whereby microwaves can be emitted from the blades 20, 20.

Further, when multiple sets of shaft-side terminals 6C, 6D are provided on the device shaft 5 as described above, it is preferable that the entirety of one set of shaft-side terminals 6C, 6D is configured to be housed inside the through-hole 13 of the port site 2 in the state in which the one set of shaft-side terminals 6C, 6D are in contact with the port site-side terminals 3A, 3B. With this configuration, the operator etc. can be protected from receiving an electric shock due to contact with the shaft-side terminals 6C, 6D.

Further, the distance M between two sets of shaft-side terminals 6C, 6D adjacent to each other in the axial direction of the device shaft 5 (FIG. 11) is preferably set equal to the length L of the port site-side terminals 3A, 3B. With this configuration, immediately after one set of terminals 6C, 6D is separated from the terminals 3A, 3B, another set of terminals 6C, 6D can be brought into contact with the terminals 3A, 3B (in the example shown in the figure, the terminals 6Cb, 6Db can be brought into contact with the terminals 3A, 3B immediately after the terminals 6Ca and 6Da are separated from the terminals 3A, 3B). This enables continuous supply of DC power to the power receiver J while minimizing the number of the terminals 6 on the shaft side.

In the example shown in the figures, one first shaft-side power supply line 7C is used in common to connect shaft-side terminals 6C (6Ca, 6Cb) of each set to the power receiver J, whereas one second shaft-side power supply line 7D is used in common to connect the shaft-side terminals 6D (6Da, 6Db) of each set to the power receiver J. Alternatively, a shaft-side power supply line 7 for connecting to the power receiver J may be provided to each of the shaft-side terminals 6C, 6D. For example, as shown in the example shown in the figures, when a set of terminals 6Ca, 6Da and a set of terminals 6Cb, 6Db are provided, a power supply line 7 to connect the terminal 6Ca to the power receiver J, a power supply line 7 to connect the terminal 6Cb to the power receiver J, a power supply line 7 to connect the terminal 6Da to the power receiver J, and a power supply line 7 to connect the terminal 6Db to the power receiver J may be provided to the device shaft 5.

Figure 13:
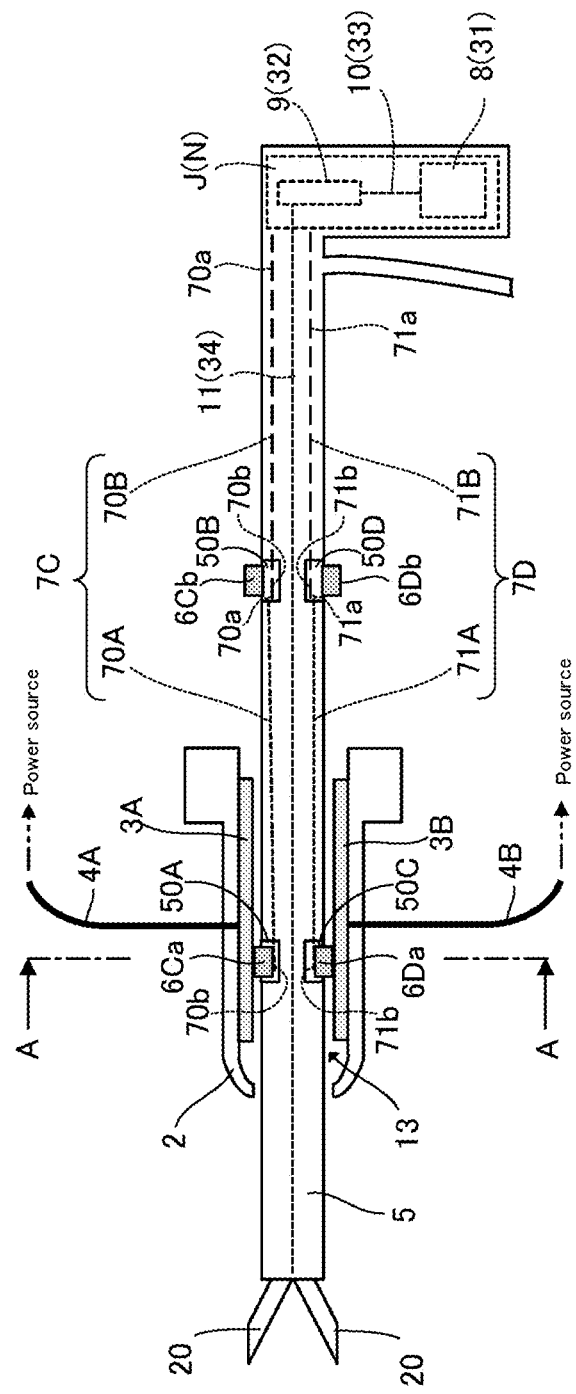
FIG. 13 is a schematic longitudinal sectional view of a power supply device according to a variation of the present invention.
Figure 14:
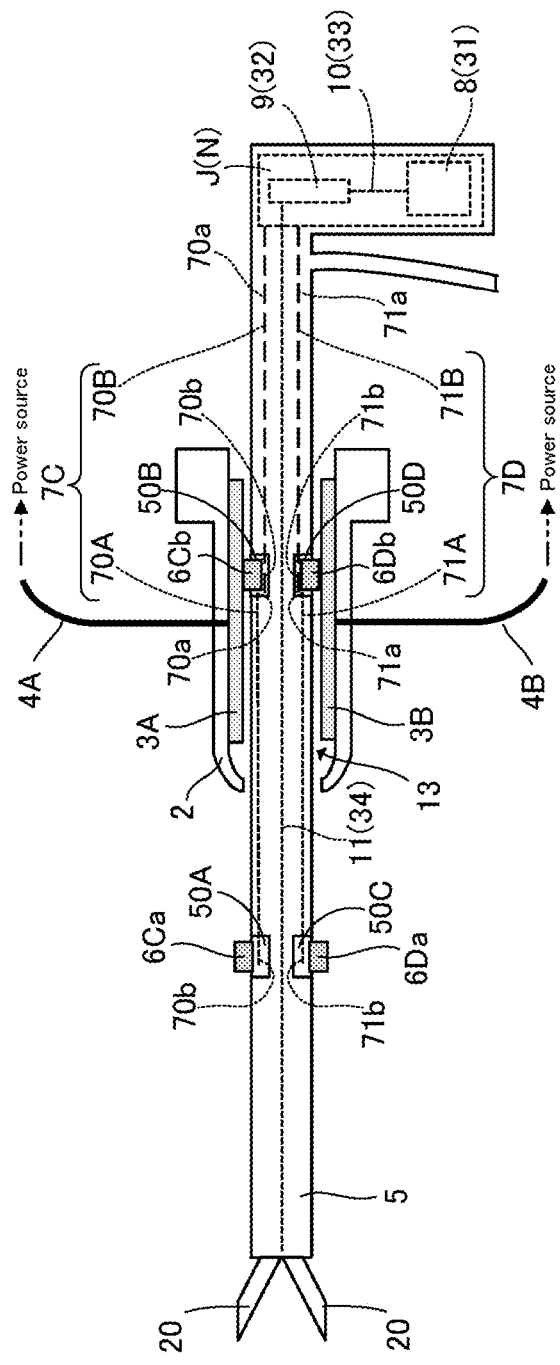
FIG. 14 is a schematic longitudinal sectional view of a power supply device according to a variation of the present invention.
Figure 15:
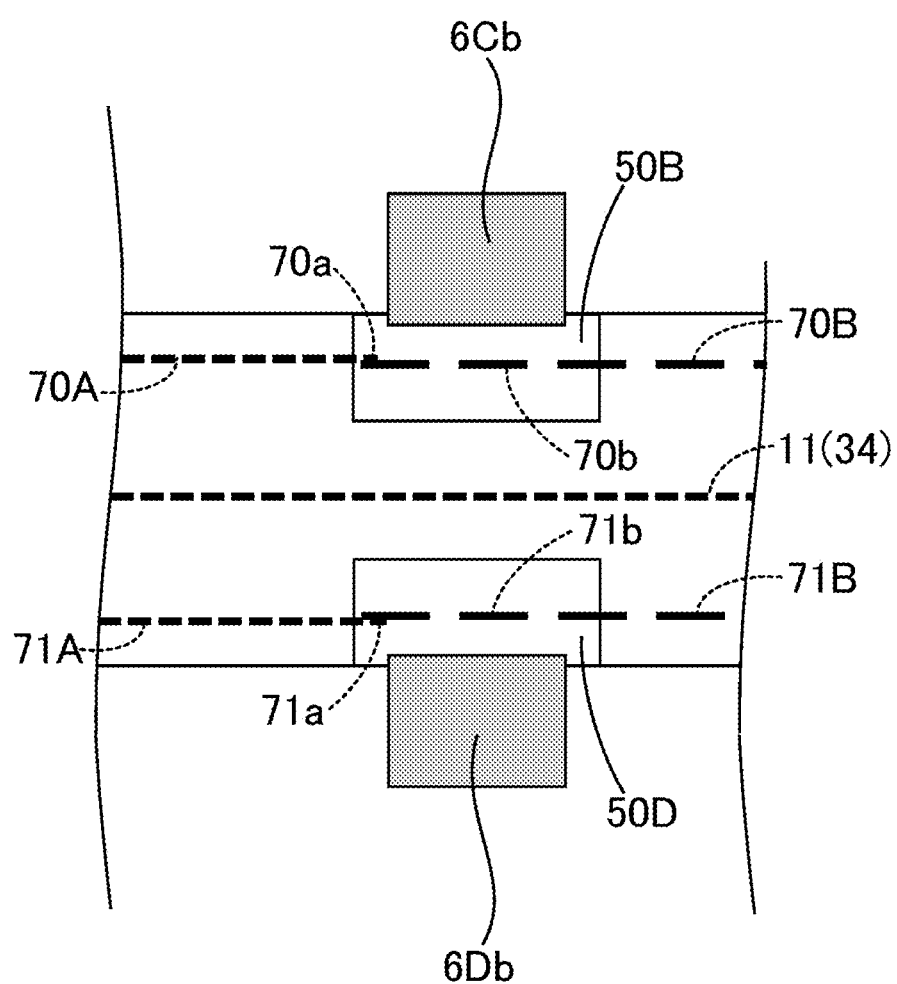
FIG. 15 is a partial enlarged cross-sectional view of FIG. 13.
Figure 16:
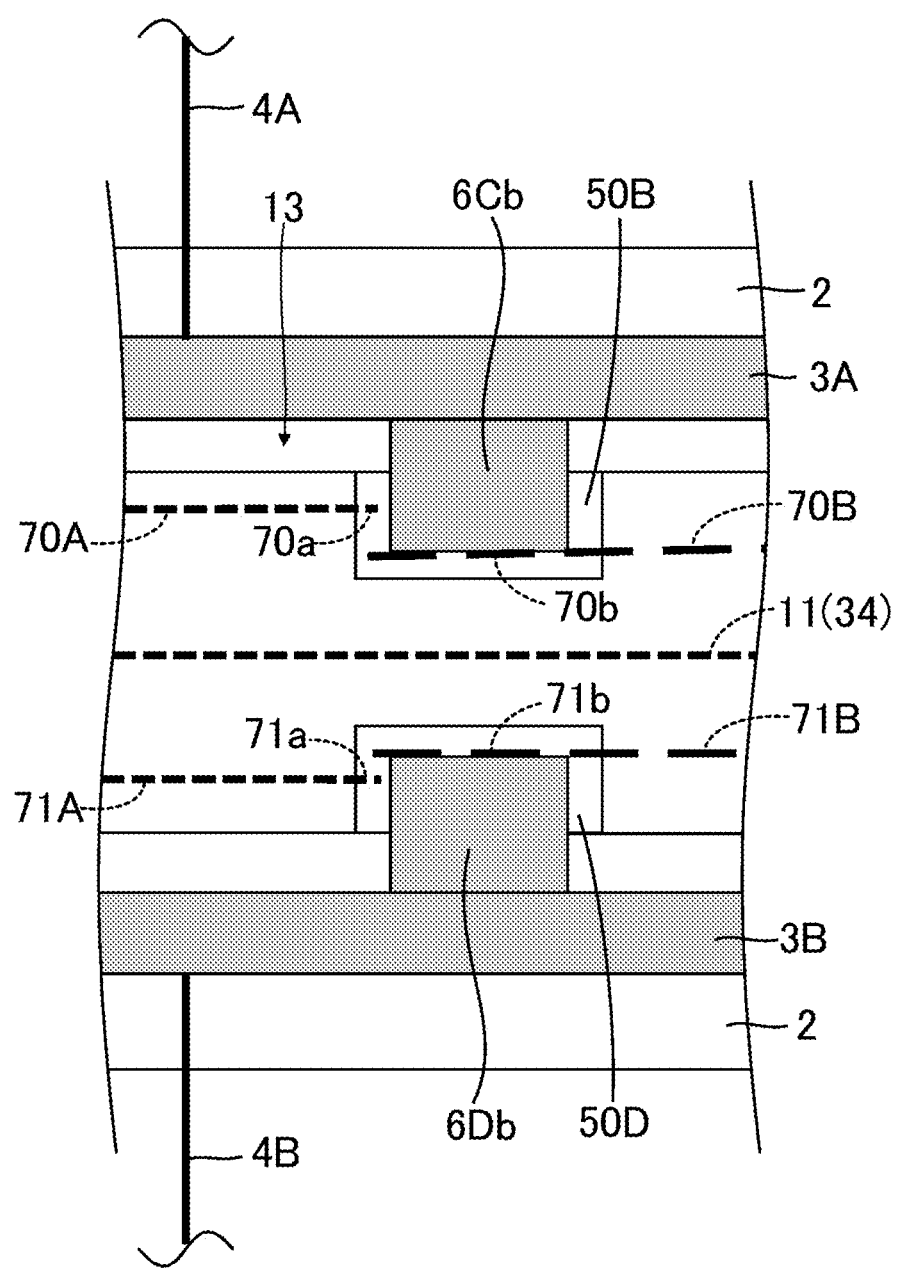
FIG. 16 is a partial enlarged cross-sectional view of FIG. 14.

When multiple sets of the shaft-side terminals 6C, 6D are provided on the device shaft 5, the power supply device of the present invention can be modified in configuration as shown in FIGS. 13 to 16. FIGS. 13 and 14 are schematic longitudinal sectional views of a power supply device according to a variation of the present invention. FIG. 13 shows a state in which the shaft-side terminals 6Ca, 6Da and the port site-side terminals 3A, 3B are in contact with each other. FIG. 14 shows a state in which the shaft-side terminals 6Cb, 6Db and the port site-side terminals 3A, 3B are in contact with each other. FIG. 15 is a partial enlarged cross-sectional view of FIG. 13. FIG. 16 is a partial enlarged cross-sectional view of FIG. 14.

In the power supply device shown in FIGS. 13 to 16, the first shaft-side power supply line 7C is composed of a plurality of first wire rods 70 serially disposed in the axial direction of the device shaft 5, whereas the second shaft-side power supply line 7D is composed of a plurality of second wire rods 71 serially disposed in the axial direction of the device shaft 5. As shown in FIGS. 13 and 14, an example in which the power supply line 7C is composed of two first wire rods 70A, 70B, and the power supply line 7D is composed of two second wire rods 71A, 71B, is described below. However, the number of wire rods 70, 71 that constitute the power supply lines 7C, 7D is not limited to 2 but can be 3 or more according to the number of sets of shaft-side terminals 6C, 6D.

Among a plurality of first wire rods 70A, 70B of which the first shaft-side power supply line 7C is composed, the first wire rod 70B that is located closest to the power receiver J is configured such that one end 70a of the first wire rod 70B on the side proximal to the power receiver J is connected to the power receiver J, whereas the other end 70b of the first wire rod 70B on the side distal to the power receiver J extends out into the recess 50B that is the closest to the power receiver J among the recesses 50A, 50B in which a terminal 6C, which is one of a pair of shaft-side terminals 6C, 6D of each set, is disposed. The first wire rods 70A that are other than the first wire rod that is the closest to the power receiver J are configured such that one end 70a of the other first wire rods 70A on the side proximal to the power receiver and the other end 70b of the other first wire rods 70A on the side distal to the power receiver respectively "extend out into the recesses 50A, 50B that are adjacent to each other in the axial direction of the device shaft 5 and in which a shaft-side terminal 6C, which is one of the pairs of shaft-side terminals 6C, 6D, is disposed."

The plurality of first wire rods 70A, 70B of which the power supply line 7C is composed are individually disposed in the recess 50 in the state in which the other end 70b of the first wire rods is supported by a spring (not shown). By pushing the shaft-side terminal 6C into the recess 50, the shaft side terminal 6C can be brought into contact with the other end 70b of the first wire rod 70 (for example, the shaft-side terminal 6Ca can be brought into contact with the other end 70b of the first wire rod 70A by pushing the shaft-side terminal 6Ca into the recess 50A). The spring may be a plate spring or a wound spring and is attached to the outer surface of the device shaft 5 (e.g., the surface of the recess 50).

As shown in FIG. 15, when the shaft-side terminal 6Cb is not pushed into the recess 50B into which ends 70a, 70b of the two adjacent first wire rods 70A, 70B extend out (that is, in the recess 50B in which one end 70a of the first wire rod 70A on the side distal to the power receiver and the other end 70b of the first wire rod 70B on the side proximal to the power receiver extend out), the other end 70b of the first wire rod 70B on the proximal side of the power receiver is lifted up by an elastic force of the spring, so that the other end 70b comes into contact with one end 70a of the first wire rod 70A on the side distal to the power receiver. When the shaft-side end 6Cb is pushed into the recess 50B as shown in FIG. 16, the shaft-side terminal 6Cb pushes and moves the other end 70b of the first wire 70B on the side proximal to the power receiver, whereby the other end 70b of the first wire rod 70B on the side proximal to the power receiver is separated from one end 70a of the first wire rod 70A on the side distal to the power receiver.

Further, as shown in FIGS. 13 and 14, among the plurality of second wire rods 71A, 71B of which the second shaft-side power supply line 7D is composed, the second wire rod 71B that is located closest to the power receiver J is configured such that one end 71a of the second wire rod 71B on the side proximal to the power receiver J is connected to the power receiver J, whereas the other end 71b of the second wire rod 71B on the side distal to the power receiver J extends out into the recess 50D that is the closest to the power receiver J among the recesses 50C, 50D in which a terminal 6B, which is one of a pair of shaft-side terminals 6A, 6B of each set, is disposed. The second wire rods 71A that are other than the second wire rod that is the closest to the power receiver J is configured such that one end 71a of the other first wire rods 71A on the side proximal to the power receiver and the other end 71b of the other first wire rods 71A on the side distal to the power receiver respectively "extend out into the recesses 50C, 50D that are adjacent to each other in the axial direction of the device shaft 5 and in which a shaft-side terminal 6B, which is the other of the pairs of shaft-side terminals 6A, 6B, is disposed."

The plurality of second wire rods 71A, 71B of which the power supply line 7D is composed are individually supported by a spring (not shown) and disposed in the recess 50. By pushing the shaft-side terminal 6D disposed in the recess 50, the shaft-side terminal 6D can be brought into contact with the other end 71b of the second wire rod 71 (for example, the shaft-side terminal 6Da can be brought into contact with the other end 71b of the second wire rod 71A by pushing the shaft-side terminal 6Da into the recess 50C). The spring may be a plate spring or a wound spring and is attached to the outer surface of the device shaft 5 (e.g., the surface of the recess 50).

As shown in FIG. 15, when the shaft-side terminal 6Db is not pushed into the recess 50D into which ends 71a, 71b of the two adjacent first wire rods 71A, 71B extend out (that is, the recess 50D in which one end 71a of the second wire rod 71A on the side distal to the power receiver and the other end 71b of the second wire rod 71B on the side proximal to the power receiver extend out), the other end 71b of the second wire rod 71B on the proximal side of the power receiver is lifted up by an elastic force of the spring so that the other end 71b comes into contact with one end 71a of the second wire rod 71A on the side distal to the power receiver. When the shaft-side end 6Db is pushed into the recess 50D as shown in FIG. 16, the shaft-side terminal 6Db pushes and moves the other end 71b of the second wire 71B on the side proximal to the power receiver, whereby the other end 71b of the second wire rod 71B on the side proximal to the power receiver is separated from one end 71a of the second wire rod 71A on the side proximal to the power receiver.

The power supply device as shown in FIGS. 13 to 16 has the above configuration. Therefore, in the state in which a shaft-side terminal 6C, which is one of a pair of shaft-side terminals 6C, 6D of one set, is pushed into the recess 50 to bring the shaft-side terminal 6C into contact with the other end 70b of one first wire rod 70 extending out into the recess 50, and a shaft-side terminal 6D, which is the other of the pair of shaft-side terminals 6C, 6D, is pushed into the recess 50 to bring the other shaft-side terminal 6D into contact with the other end 71b of one second wire rod 71 extending out into the recess 50, one set of shaft-side terminals 6C, 6D are placed into the through-hole 13 of the port site 2 to bring a shaft-side terminal 6C, which is one of the one set of shaft-side terminals 6C, 6D, into contact with one of a pair of port site-side terminals 3A, 3B, and to bring a shaft-side terminal 6D, which is the other of the one set of shaft-side terminals 6C, 6D, into contact with the other of the pair of port site-side terminals 3A, 3B (FIG. 16), electric power from the power source can be supplied to the power receiver J by means of the first and second port site-side power supply lines 4A, 4B, the pair of port site-side terminals 3A, 3B, the pair of shaft-side terminals 6C, 6D of the one set, the range of the first shaft-side power supply line 7C extending from the other end 70b of the one first wire rod 70 to the power receiver J side, and the range of the second shaft-side power supply line 7D extending from the other end 70b of the one second wire rod 71 to the power receiver J side.

For example, as shown in FIG. 16, in the state in which the shaft-side terminal 6Cb is brought into contact with the other end 70b of the first wire rod 70B and the port site-side terminal 3A, whereas the shaft-side terminal 6Db is brought into contact with the other end 71b of the second wire rod 71B and the port site-side terminal 3B, electric power from the power source can be supplied to the power receiver J by means of the power supply lines 4A, 4B, the port site-side terminals 3A, 3B, the shaft-side terminal 6C, 6D, the first wire rod 70B (the range of the first shaft-side power supply line 7C extending from the other end 70b of the first wire rod 70B to the power receiver side), and the second wire rod (the range of the second shaft-side power supply line 7D extending from the other end 70b of the second wire rod 71 to the power receiver side).

According to the power supply device shown in FIG. 13, when the above operation that "a shaft-side terminal 6C, which is one of a single pair of shaft-side terminals 6C, 6D, is pushed into the recess 50 to bring the shaft-side terminal 6C into contact with the other end 70b of one first wire rod 70 extending out into the recess 50, whereas the other shaft-side terminal 6D is pushed into the recess 50 to bring the other shaft-side terminal 6D into contact with the other end 71b of one second wire rod 71 extending out into the recess 50" is performed, the other end 70b of the one first wire rod 70 can be disposed so as not to come into contact with one end 70a of the first wire rod 70 on the side distal to the power receiver and the other end 71b of one second wire rod 71 can be disposed so as not to come into contact with one end 71a of the second wire rod 71 on the side distal to the power receiver. With this configuration, electric power is prevented from flowing into the first wire rods 70, which are located on the side distal to the power receiver relative to one first wire rod 70 or to the second wire rods 71, which are located on the side distal to the receiver relative to one second wire 71.

For example, in the state shown in FIG. 16, the other end 70b of the first wire 70B is not in contact with one end 70a of the first wire rod 70A on the side distal to the power receiver and the other end 71b of the second wire 71B is not in contact with one end 71a of the second wire rod 71A on the side distal to the power receiver, whereby electric power can be prevented from flowing into the first wire rod 70A and the second wire rod 71A.

Figure 17:
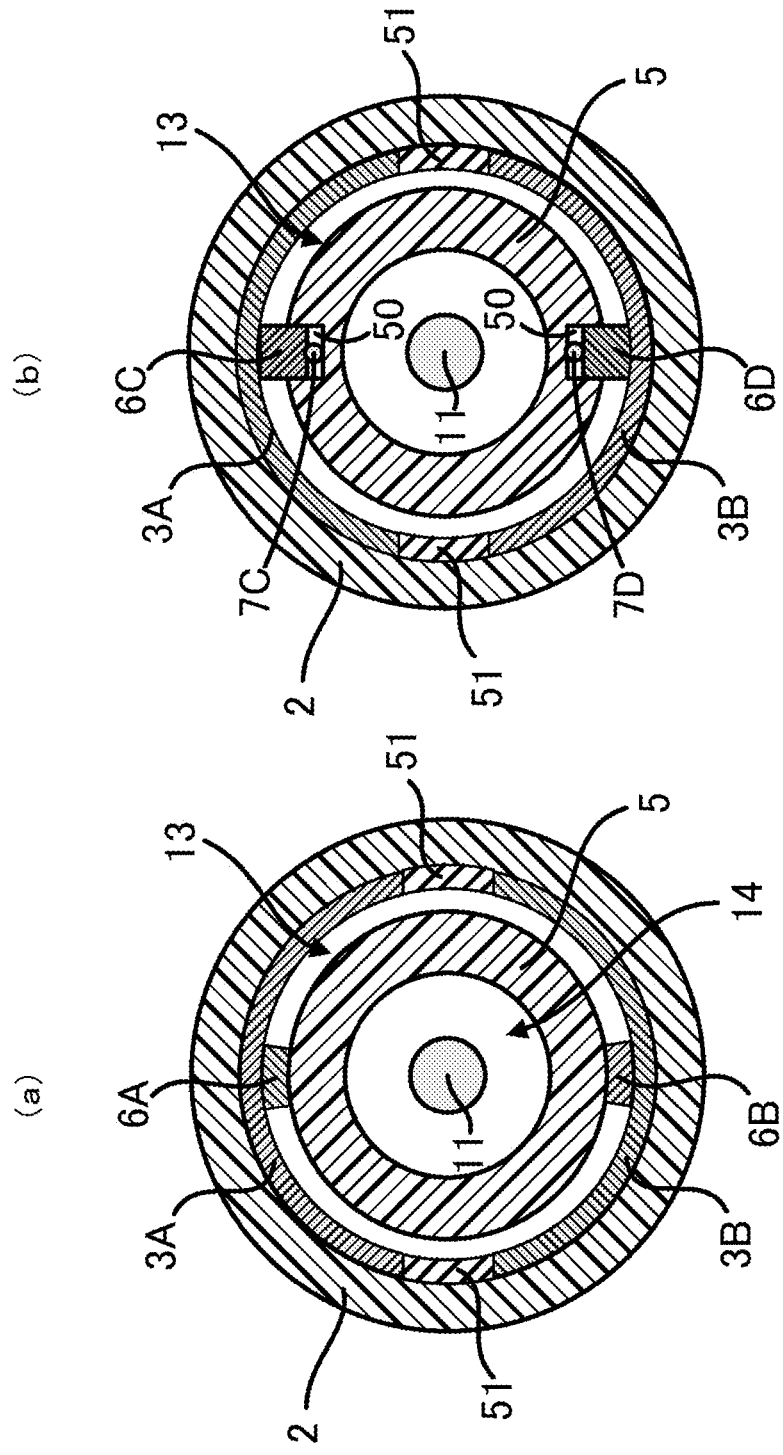
FIG. 17(a) is a schematic cross-section of the power supply device shown in FIGS. 1 to 8 with an insulator according to a variation of the present invention.
FIG. 17(b) is a schematic cross-section of the power supply device shown in FIGS. 9 to 12 with an insulator according to a variation of the present invention.

In the power supply device shown in FIGS. 1 to 16, the insulator 51 may be provided on the gap S between one-side ends of the port site-side terminals 3A, 3B, which are on one side, and on the gap S between the opposite-side ends of the port site-side terminals 3A, 3B, which are on the other side, (FIG. 17(a) shows the power supply device shown in FIGS. 1 to 8 with an insulator 51 according to a variation of the present invention. FIG. 17(b) shows the power supply device shown in FIGS. 9 to 12 with an insulator 51 according to a variation of the present invention). The insulator 51 comprises, for example, a rubber, a resin, etc., and is fixed to the inner surface of the port site 2 by using an adhesive or the like.

In the power supply device shown in FIGS. 1 to 17, the power receiver J (microwave output portion) is preferably configured to be capable of supplying a microwave power of 20 W or more and 100 W or less to the tip of the device shaft. With this configuration, the microwave power required for surgical operation, such as hemostasis, can be supplied to the tip of the device shaft 5, and the dimensions, volume, and weight of the power receiver J can be reduced to about 50 mm×100 mm×5 mm, a single-digit cubic centimeter, and a single-digit gram (for example, about 5 g), respectively. This facilitates incorporation of the power receiver J (microwave output portion) into the grip 5a of the device shaft 5.

When microwaves are directly supplied from the outside as in the conventional technique, it is necessary to use thick, rigid coaxial cables having a diameter of about 10 mm. According to the power supply device shown in FIGS. 1 to 17, DC power is supplied to the power receiver J, whereby the microwave amplifier 9 can easily achieve a power conversion efficiency of about 50%. To achieve a power conversion efficiency of about 50% by the microwave amplifier 9, supplying an electric power of 200 W or less to the power receiver J is sufficient to supply a microwave power of 20 W or more and 100 W or less to the tip of the device shaft 5. Therefore, a ultra-thin power supply line with a diameter of about 1 mm can be used as the port site-side power supply line 4 and the shaft-side power supply line 7. With this configuration, since the port site-side power supply line 4 is an ultra-thin power supply line, the ease of handling of the device shaft 5 in the state in which the device shaft 5 is inserted into the port site 2 can be significantly improved.

In order to supply a microwave power usable in operation by using ultra-thin power supply lines 4, 7 as described above, the microwaves emitted from the tip of device shaft 5 preferably have a frequency of 300 MHz or more and 6 GHz or less, and more preferably 2.45 GHz±50 MHz. The power conversion efficiency of the microwave amplifier (the ratio of the microwave power output to the DC power used) is preferably 30% or more and 80% or less, and more preferably 50% or more. The microwave output supplied to the tip of the device shaft 5 is preferably 20 W or more and 100 W or less, and more preferably 30 W or more and 60 W or less. The DC power supplied to the power receiver J is preferably 10 W or more and 150 W or less, and more preferably 50 W or more and 100 W or less.

Further, the microwave amplifier 9 can achieve a power conversion efficiency of 50% or more by using, for example, a gallium nitride transistor as the microwave amplifier 9. In particular, by using a gallium nitride HEMT (high electron mobility transistor), a high power conversion efficiency can be achieved. Since the use of the microwave amplifier 9 with a high power conversion efficiency as described above can reduce the power that needs to be supplied from the outside, the power supply lines 4, 7 can be made ultra-thin and lightweight.

In the power supply device described above, the power receiver J may include a DC power source unit and a microwave output unit. In this case, the DC power source unit constitutes a microwave oscillator that oscillates microwaves and a microwave amplifier that amplifies microwaves. Externally supplied DC power is used as a DC power source (an operating source) to operate the microwave oscillator and the microwave amplifier. In the above case, for example, a voltage control unit that can control the voltage may be added to the microwave output unit. In the above case, for example, an impedance matching circuit and an output control circuit may also be added to the power receiver J.

In the above, the connection between the microwave oscillator 8 and the microwave amplifier 9 is made by a coaxial cable. However, when the microwave oscillator 8 and the microwave amplifier 9 are located close together, or when the microwave oscillator 8 and the microwave amplifier 9 are formed on the same circuit board, the connection between the microwave oscillator 8 and the microwave amplifier 9 may be made by a microwave transmission line, such as a microstrip line.

The power supply device described above may comprise a power receiver J that outputs microwaves when AC power from an AC power source is supplied to the power receiver J. The AC power as referred to herein means an AC power of commercial frequency supplied to household distribution lines etc. (in Japan, the frequency is 50 Hz or 60 Hz and the voltage is approximately 100 V).

In the above case, AC power from the AC power source is supplied to the power receiver J via the port site-side power supply lines 4A, 4B and the shaft-side power supply lines 7A, 7B or 7C, 7D by using AC power supply lines as the port site-side power supply lines 4A, 4B, and shaft-side power supply lines 7A, 7B or 7C, 7D. The power receiver J comprises at least a converter, a microwave oscillator, and a microwave amplifier. The converter converts AC power supplied from the AC power source to the power receiver J into DC power. The microwave oscillator oscillates microwaves by using DC power converted by the converter as a DC power source (an operating source). The microwave amplifier amplifies microwaves by using DC power converted by the converter as a DC power source (an operating source).

When AC power is supplied to the power receiver J as described above, an AC-to-DC power converter can easily achieve a power conversion efficiency of about 90% or more. Therefore, it is easily feasible that the amount of AC power supplied to the power receiver J is 1.11 times that of DC power that would be supplied to the power receiver J. As described above, if the converter achieves an AC-to-DC power conversion efficiency of about 90% and the amount of the AC power supplied to the power receiver J is 1.11 times that of DC power that would be supplied to the power receiver J, an effect that is equivalent to that achieved by supplying DC power to the power receiver J can be achieved under the condition in which a very thin power supply line that is substantially equivalent to the power supply line used to supply DC power to the power receiver J is used.

The power supply device shown in FIGS. 1 to 17 can be modified to comprise a power receiver N capable of outputting radio-frequency waves when DC power is supplied from a DC power source. In this case, the power supply device shown in FIGS. 1 to 17 comprises a power receiver N comprising a radio-frequency oscillator 31 and a radio-frequency amplifier 32; a third coaxial cable 33; and a fourth coaxial cable 34, in place of the power receiver J; the first coaxial cable 10; and the second coaxial cable 11 (see the reference numerals in parentheses in FIGS. 1, 6, 7, 9, 13, and 14).

The power receiver N, which comprises a radio-frequency oscillator 31 and a radio-frequency amplifier 32, is housed inside the grip 5a provided on the base end side of the device shaft 5. The third coaxial cable 33 and the fourth coaxial cable 34 are provided on the device shaft 5. The third coaxial cable 33 connects the radio-frequency oscillator 31 and the radio-frequency amplifier 32. The fourth coaxial cable 34 connects the radio-frequency amplifier 32 and the tip of the device shaft 5 (blades 20, 20).

The power supply device according to a variation of the present invention having the above configuration is configured such that in the state in which the device shaft 5 is inserted in the through-hole 13 of the port site 2 and the port site-side terminal 3 and the shaft-side terminal 6 are in contact with each other, DC power from a DC power source is supplied to a power receiver N by means of the port site-side power supply lines 4A, 4B, port site-side terminals 3A, 3B, and shaft-side terminals 6A, 6B or 6C, 6D, and shaft-side power supply lines 7A, 7B or 7C, 7D, so that the radio-frequency oscillator 31 oscillates radio-frequency waves, and the radio-frequency waves are concurrently supplied to the radio-frequency amplifier 32 via the third coaxial cable 33 and amplified, and the amplified radio-frequency waves are transmitted via the fourth coaxial cable 34 to the tip of the device shaft 5 (blades 20, 20) and can be emitted therefrom. According to the above power supply device, the radio-frequency waves emitted from the tip of the device shaft 5 (blades 20, 20) can coagulate the surgical site to perform hemostasis, amputation, etc. The radio-frequency waves emitted from the tip of the device shaft 5 preferably have a frequency of 150 KHz to 10 MHz.

Further, the power supply device shown in FIGS. 1 to 17 can be modified to comprise a power receiver N capable of outputting radio-frequency waves when AC power is supplied from an AC power source. In this case, the power receiver N comprises at least a converter, a radio-frequency oscillator, and a radio-frequency amplifier. By using AC power supply lines as the port site-side power supply lines 4A, 4B and shaft-side power supply lines 7A, 7B or 7C, 7D, the port site-side power supply line 4A is configured to connect the port site-side terminal 3A and a first pole of the AC power source, whereas the port site-side power supply line 4B is configured to connect the port site-side terminal 3B and a second pole of the AC power source. In the state in which the device shaft 5 is inserted in the through-hole 13 of the port site 2 and the port site-side terminal 3 and the shaft-side terminal 6 are in contact with each other, AC power from the power source is supplied to the power receiver N by the port site-side power supply lines 4A, 4B, port site-side terminals 3A, 3B, shaft-side terminals 6A, 6B or 6C, 6D, and the shaft-side power supply lines 7A, 7B, or 7C, 7D. The converter converts AC power supplied from the AC power source to the power receiver N into DC power. The radio-frequency wave oscillator oscillates radio-frequency waves by using DC power converted by the converter as a DC power source (an operating source). The radio-frequency wave amplifier amplifies radio-frequency waves by using the DC power converted by the converter as a DC power source (an operating source).

The functions of the device shaft 5 of the power supply device of the present invention are not limited to those described above, and can be various functions that are feasible by supplying electric power. The application of the power supply device of the present invention is also not limited to hemostasis, and can be used for various purposes depending on the functions of the device shaft 5 and other factors. In the above examples, the power receiver is provided at the base end portion of the device shaft 5. However, depending on the application of the power supply device, the power receiver can be provided at the tip of the device shaft 5 and electric power can be supplied to the power receiver.

DESCRIPTION OF REFERENCE NUMERALS

2: a port site
3, 3A, 3B: port site-side terminals
4, 4A, 4B: port site-side power supply lines
5: a device shaft
6, 6A, 6Aa, 6Ab, 6B, 6Ba, 6Bb, 6C, 6Ca, 6Cb, 6D, 6Da, 6Db: shaft-side terminals
7, 7A, 7Aa, 7Ab, 7B, 7Ba, 7Bb, 7C, 7D: shaft-side power supply lines
8: a microwave oscillator
9: a microwave amplifier
12: a cylindrical cover
13: a through-hole of the port site
40: a gas supply tube
50, 50A, 50B, 50C, 50D: recesses
70, 70A, 70B: first wire rods
70a: one end of the first wire rod
70b: the other end of the first wire rod
71, 71A, 71B: second wire rods
71a: one end of the second wire rod
71b: the other end of the second wire rod
J, N: power receivers

The invention claimed is:

1. A power supply device comprising:
a port site formed of an insulating material and comprising a through-hole;
a port site-side terminal provided on an inner surface of the through-hole of the port site;
a port site-side power supply line connecting the port site-side terminal to a power source;
a device shaft that is insertable into the through-hole;
a power receiver provided on the device shaft;
a shaft-side terminal provided on an outer surface of the device shaft;
a shaft-side power supply line provided on the device shaft to connect the power receiver and the shaft-side terminal; and
a cylindrical cover formed of a stretchable insulating material,
wherein insertion of the device shaft into the through-hole of the port site enables the port site-side terminal and the shaft-side terminal to be in contact with each other,
in the state in which the port site-side terminal and the shaft-side terminal are in contact with each other, electric power from the power source is allowed to be supplied to the power receiver through the port site-side power supply line, the port site-side terminal, the shaft-side terminal, and the shaft-side power supply line,
the cylindrical cover is provided so as to allow the device shaft to pass inside the cylindrical cover, and one end of the cylindrical cover is fixed to the outer surface of the device shaft at a midway position of the device shaft,
the shaft-side terminal is provided on a tip side of the device shaft with respect to the midway position, and
in the state in which the port site-side terminal and the shaft-side terminal are in contact with each other, another end of the cylindrical cover is in contact with one end of the port site and an entirety of the shaft-side terminal in contact with the port site-side terminal is housed in a space composed of the inside of the cylindrical cover and the through-hole of the port site.

2. The power supply device according to claim 1, further comprising a gas supply tube connected to the port site, wherein gas is configured to flow in the gas supply tube is introduced into the through-hole and is discharged from an opening of the through-hole at another end of the port site.

3. The power supply device according to claim 1, wherein in the state in which the port site-side terminal and the shaft-side terminal are in contact with each other, the entirety of the shaft-side terminal in contact with the port site-side terminal is positioned inside the through-hole.

4. The power supply device according to claim 1, wherein the port site-side terminal comprises a pair of port site-side terminals that are disposed diametrically opposite to each other in a radial direction of the port site;
the port site-side power supply line comprises a first port site-side power supply line for connecting one of the port site-side terminals and a power source, and a second port site-side power supply line for connecting the other of the port site-side terminals and the power source;
the shaft-side terminal comprises a first pair of shaft-side terminals comprising a first and second shaft-side terminal that are disposed diametrically opposite to each other in a radial direction of the device shaft;
the shaft-side power supply line comprises a first shaft-side power supply line for connecting the first shaft-side terminal of the first pair of shaft-side terminals and the power receiver, and a second shaft-side power supply line for connecting the second shaft-side terminal of the first pair of shaft-side terminals and the power receiver; and wherein when the first pair of shaft-side terminals are placed into the through-hole of the port site to bring the first shaft-side terminal into contact with one of the pair of port site-side terminals and bring the second shaft-side terminal into contact with the other of the pair of port site-side terminals, whereby electric power from the power source is allowed to be supplied to the power receiver by the first port site-side power supply line, and second port site-side power supply line, the pair of port site-side terminals, the first pair of shaft-side terminals, and the first shaft-side power supply line, and the second shaft-side power supply lines.

5. The power supply device according to claim 4, wherein in a circumferential direction of the port site, a gap is provided between one-side ends of the pair of port site-side terminals, which are on one side, and between the opposite-side ends of the pair of port site-side terminals, which are on another side, and a width of each of the first pair of shaft-side terminals is shorter than the width of the gap.

6. The power supply device according to claim 4, wherein the shaft-side terminal comprises a second pair of shaft-side terminals comprising a first and second shaft-side terminal that are disposed diametrically opposite to each other in a radial direction of the device shaft;

the second pair of shaft-side terminals is provided so as to be spaced apart from the first pair of shaft-side terminals in an axial direction of the device shaft;

the shaft-side power supply line comprises the first shaft-side power supply line for connecting the first shaft-side terminals of the first pair of shaft-side terminals and the second pair of shaft-side terminals and the power receiver, and the second shaft-side power supply line for connecting the second shaft-side terminal of the first pair of shaft-side terminals and the second pair of shaft-side terminals and the power receiver;

wherein when the first pair of shaft-side terminals or the second pair of shaft-side terminals are placed into the through-hole of the port site to bring one shaft-side terminal of either the first pair of shaft-side terminals or the second pair of shaft-side terminals into contact with one of the pair of port site-side terminals and bring the other shaft-side terminal of either the first pair of shaft-side terminals or the second pair of shaft-side terminals into contact with the other of the pair of port site-side terminals, whereby electric power from the power source is configured to be supplied to the power receiver by the first and second port site-side power supply lines, the pair of port site-side terminals, either the first pair of shaft-side terminals or the second pair of shaft-side terminals, and the first and second shaft-side power supply lines.

7. The power supply device according to claim 6, wherein in the state in which the first shaft-side terminal of either the first pair of shaft-side terminals or the second pair of shaft-side terminals is in contact with one of the pair of port site-side terminals and the second shaft-side terminal of the either the first pair of shaft-side terminals or the second pair of shaft-side terminals is in contact with the other of the pair of port site-side terminals, the entirety of either the first pair of shaft-side terminals or the second pair of shaft-side terminals is housed in the through-hole of the port site.

8. The power supply device according to claim 6, wherein a distance between the first pair of shaft-side terminals and second pair of shaft-side terminals that are adjacent to each other in the axial direction of the device shaft is equal to a length of the pair of port site-side terminals.

9. The power supply device according to claim 6, wherein the first pair of shaft-side terminals, the second pair of shaft-side terminals, or both are individually supported by one or more first springs and disposed in a first pair of recesses and a second pair of recesses formed on the outer surface of the device shaft;

the first shaft-side power supply line passes through the first pair of recesses in which the first shaft-side terminals of the first pair of side-shaft terminals and the second pair of shaft-side terminals are of disposed, and the second shaft-side power supply line passes through the second pair of recesses in which the second shaft-side terminals of the first pair of shaft-side terminals and the second pair of shaft-side terminals are disposed;

wherein when the first shaft-side terminal of either the first pair of shaft-side terminals or the second pair of shaft-side terminals is pushed down so as to come into contact with the first shaft-side power supply line that passes through one of the first pair of recesses and the second shaft-side terminal of either the first pair of shaft-side terminals or the second pair of shaft-side terminals is pushed down so as to come into contact with the second shaft-side power supply line that passes through one of the second pair of recesses, either the first pair of shaft-side terminals or the second pair of shaft-side terminals are placed into the through-hole of the port site to bring the first shaft-side terminal of either the first pair of shaft-side terminals or the second pair of shaft-side terminals into contact with one of the pair of port site-side terminals and bring the second shaft-side terminal of either the first pair of shaft-side terminals or the second pair of shaft-side terminals into contact with the other of the pair of port site-side terminals, whereby electric power from the power source is configured to be supplied to the power receiver by the first and second port site-side power supply lines, the pair of port site-side terminals, either the first pair of shaft-side terminals or the second pair of shaft-side terminals the first shaft-side power supply line, and the second shaft-side power supply line.

10. The power supply device according to claim 9, wherein the first shaft-side power supply line comprises a plurality of first wire rods that are serially disposed in the axial direction of the device shaft;

the second shaft-side power supply line comprises a plurality of second wire rods that are serially disposed in the axial direction of the device shaft;

among the plurality of first wire rods, the first wire rod that is the closest to the power receiver is configured such that one end of the first wire rod on a side proximal to the power receiver is connected to the power receiver, and the other end of the first wire rod on a side distal to the power receiver extends out into a recess that is the closest to the power receiver among the first pair of recesses in which the first shaft-side terminals of the first pair of shaft-side terminals and the second pair of shaft-side terminals are disposed, whereas the first wire rods other than the first wire rod that is the closest to the power receiver are configured such that one end of the first wire rods on the side proximal to the power receiver and the other end of the first wire rods on the side distal to the power receiver respectively extend out into the first pair of recesses that are adjacent to each other in the axial direction of the device shaft and in which the first shaft-side terminals of the first pair of shaft-side terminals and the second pair of shaft-side terminals are disposed and;

the plurality of first wire rods are configured such that the other ends of the first wire rods are individually supported by one or more second springs and disposed in the first pair of recesses wherein by pushing the first shaft-side terminals of the first pair of shaft-side terminals or the second pair of shaft-side terminals into the first pair of recesses, the first shaft-side terminals of the first pair of shaft-side terminals or the second pair of shaft-side terminals are brought into contact with the other ends of the first wire rods disposed in the first pair of recess;

when the first shaft-side terminals of the first pair of shaft-side terminals or the second pair of shaft-side terminals is not pushed into the recess that is the closest to the power receiver among the first pair of recesses into which one end of the first wire rod on the side distal to the power receiver and the other end of the first wire rods on the side proximal to the power receiver extend out, the other end of the first wire rods on the side proximal to the power receiver is lifted up by an elastic force of the one or more second springs, whereby the other end of the first wire rods comes into contact with one end of the first wire rods on the side distal to the power receiver; when the first shaft-side terminals of the first pair of shaft-side terminals or the second pair of shaft-side terminals is pushed into the recess that is the closest to the power receiver among the first pair of recesses, the first shaft-side terminals of the first pair of shaft-side terminals or the second pair of shaft-side terminals pushes and moves the other end of the first wire rods on the side proximal to the power receiver, so that the other end of the first wire rods on the side proximal to the power receiver is separated from one end of the first wire rods on the side distal to the power receiver;

among the plurality of second wire rods, the second wire rod that is the closest to the power receiver is configured such that one end of the second wire rod on the side proximal to the power receiver is connected to the power receiver, and the other end of the second wire rod on the side distal to the power receiver extends out into a recess that is the closest to the power receiver among the second pair of recesses in which the second shaft-side terminals of the first pair of shaft-side terminals and the second pair of shaft-side terminals are set is disposed, whereas the second wire rods other than the second wire rod that is the closest to the power receiver are configured such that one end of the second wire rods on the side proximal to the power receiver and the other end of the second wire rods on the side distal to the power receiver respectively extend out into the second pair of recesses that are adjacent to each other in the axial direction of the device shaft and in which the second shaft-side terminals of the first pair of shaft-side terminals and the second pair of shaft-side terminals are disposed;

the plurality of second wire rods are configured such that the other ends of the second wire rods are individually supported by one or more third springs and disposed in the second pair of recesses by pushing the second shaft-side terminals of the first pair of shaft-side terminals or the second pair of shaft-side terminals into the second pair of recesses, the second shaft-side terminals of the first pair of shaft-side terminals or the second pair of shaft-side terminals are is brought into contact with the other end of the second wire rods disposed in the second pair of recesses;

when the second shaft-side terminals of the first pair of shaft-side terminals or the second pair of shaft-side terminals is not pushed into the recess that is the closest to the power receiver among the second pair of recesses into which one end of the second wire rods on the side distal to the power receiver and the other end of the second wire rods on the side proximal to the power receiver extend out, the other end of the second wire rods on the side proximal to the power receiver is lifted up by an elastic force of the one or more third springs, whereby the other end of the second wire rods comes into contact with one end of the second wire rods on the side distal to the power receiver; when the second shaft-side terminals of the first pair of shaft-side terminals or the second pair of shaft-side terminals is pushed into the recess that is the closest to the power receiver among the second pair of recesses, the second shaft-side terminals of first pair of shaft-side terminals or the second pair of shaft-side terminals pushes and moves the other end of the second wire rods on the side proximal to the power receiver, so that the other end of the second wire rods on the side proximal to the power receiver is separated from one end of the second wire rods on the side distal to the power receiver.

11. The power supply device according to claim 1, wherein
the power source is a DC or AC power source, and
the power receiver is configured to output microwaves when DC or AC power is supplied from the power source.

12. The power supply device according to claim 1, wherein
the power source is a DC or AC power source, and
the power receiver is configured to output radio-frequency waves when DC or AC power is supplied from the power source.

13. A power supply device comprising:
a port site formed of an insulating material and comprising a through-hole;
a port site-side terminal provided on an inner surface of the through-hole of the port site;
a port site-side power supply line connecting the port site-side terminal to a power source;
a device shaft that is insertable into the through-hole;
a power receiver provided on the device shaft;
a shaft-side terminal provided on an outer surface of the device shaft; and
a shaft-side power supply line provided on the device shaft to connect the power receiver and the shaft-side terminal;
wherein the power receiver comprises at least a microwave oscillator and a microwave amplifier;
insertion of the device shaft into the through-hole of the port site enables the port site-side terminal and the shaft-side terminal to be in contact with each other;
in the state in which the port site-side terminal is in contact with the shaft-side terminal, electric power from the power source is supplied to the power receiver by the port site-side power supply line, the port site-side terminal, the shaft-side terminal, and the shaft-side power supply line;

the power source is a first DC power source;

the microwave oscillator is configured to oscillate the microwaves by using DC power supplied from the power source to the power receiver as a second DC power source; and the microwave amplifier is configured to amplify the microwaves by using the DC power supplied from the power source to the power receiver as the second DC power source.

14. A power supply device comprising:

a port site formed of an insulating material and comprising a through-hole;

a port site-side terminal provided on the inner surface of the through-hole of the port site;

a port site-side power supply line connecting the port site-side terminal to a power source;

a device shaft that is insertable into the through-hole;

a power receiver provided on the device shaft;

a shaft-side terminal provided on an outer surface of the device shaft; and a shaft-side power supply line provided on the device shaft to connect the power receiver and the shaft-side terminal;

wherein the power receiver comprises at least a converter, a microwave oscillator, and a microwave amplifier;

insertion of the device shaft into the through-hole of the port site enables the port site-side terminal and the shaft-side terminal to be in contact with each other;

in the state in which the port site-side terminal is in contact with the shaft-side terminal, electric power from the power source is supplied to the power receiver by means of the port site-side power supply line, the port site-side terminal, the shaft-side terminal, and the shaft-side power supply line;

the power supply is an AC power source;

the converter is configured to convert AC power supplied from the power source to the power receiver to DC power, the microwave oscillator is configured to oscillate microwaves by using the DC power converted by the converter as a DC power source; and the microwave amplifier is configured to amplify the microwaves by using the DC power converted by the converter as the DC power source.

15. The power supply device according to claim 13, wherein the microwave oscillator is configured to oscillate the microwaves having a frequency of 2.45 GHz±50 MHz, the microwave amplifier has a power conversion efficiency of a range of 30% to 80%, and the power source is configured to supply power to the power receiver in a range of 10 W to 150 W.

* * * * *